(12) United States Patent
Klein

(10) Patent No.: US 9,504,089 B2
(45) Date of Patent: Nov. 22, 2016

(54) SYSTEM AND METHOD FOR WIRELESS STATION BRIDGING

(71) Applicant: BROADCOM CORPORATION, Irvine, CA (US)

(72) Inventor: Philippe Klein, Jerusalem (IL)

(73) Assignee: BROADCOM CORPORATION, Irvine, CA (US)

( * ) Notice: Subject to any disclaimer, the term of this patent is extended or adjusted under 35 U.S.C. 154(b) by 365 days.

(21) Appl. No.: 13/859,166

(22) Filed: Apr. 9, 2013

(65) Prior Publication Data

US 2013/0301553 A1 Nov. 14, 2013

Related U.S. Application Data

(60) Provisional application No. 61/646,417, filed on May 14, 2012, provisional application No. 61/809,505, filed on Apr. 8, 2013.

(51) Int. Cl.
| | | |
|---|---|---|
| *H04L 12/705* | (2013.01) | |
| *H04W 84/12* | (2009.01) | |
| *H04W 72/04* | (2009.01) | |
| *H04W 76/02* | (2009.01) | |
| *H04W 88/04* | (2009.01) | |

(52) U.S. Cl.
CPC .............. *H04W 84/12* (2013.01); *H04W 72/04* (2013.01); *H04W 76/022* (2013.01); *H04L 45/18* (2013.01); *H04W 88/04* (2013.01)

(58) Field of Classification Search
CPC ....................................................... H04L 45/18
USPC ................ 370/329, 328, 338, 392, 216, 254
See application file for complete search history.

(56) References Cited

U.S. PATENT DOCUMENTS

| | | | | |
|---|---|---|---|---|
| 7,039,068 | B1 * | 5/2006 | Halasz ................. | H04W 99/00 370/428 |
| 7,653,011 | B2 * | 1/2010 | Rahman ................ | H04L 45/02 370/229 |
| 7,703,132 | B2 * | 4/2010 | Volpano et al. ................ | 726/15 |
| 8,059,666 | B2 * | 11/2011 | Cho ........................ | H04W 8/04 370/389 |
| 8,108,469 | B2 * | 1/2012 | Kent, Jr. .............. | G06Q 10/107 709/204 |
| 8,108,496 | B2 * | 1/2012 | Spitaels ............. | H04L 12/4625 709/220 |

(Continued)

FOREIGN PATENT DOCUMENTS

| | | |
|---|---|---|
| EP | 1401154 A2 | 3/2004 |
| EP | 1718004 A1 | 11/2006 |
| WO | 2007098063 A1 | 8/2007 |

OTHER PUBLICATIONS

Engwer: ""WDS" Clarifications"; IEEE Draft; Jul. 19, 2005; pp. 1-9; vol. IEEE P802.11.

(Continued)

*Primary Examiner* — Andrew Lai
*Assistant Examiner* — Andrew C Lee
(74) *Attorney, Agent, or Firm* — Garlick & Markison; Bruce E. Garlick

(57) ABSTRACT

A station in a basic service set of a wireless network includes layer 2 bridging functionality to one or more nodes in external networks. An access point in the basic service set acts as a control plane for the bridging functionality. The access point includes bridge address learning and a bridging table to map destination addresses and associated bridging stations.

20 Claims, 20 Drawing Sheets

(56) References Cited

U.S. PATENT DOCUMENTS

| | | | |
|---|---|---|---|
| 8,630,275 B2* | 1/2014 | Ji et al. | 370/338 |
| 2003/0167338 A1* | 9/2003 | Hare et al. | 709/236 |
| 2004/0103282 A1* | 5/2004 | Meier | G06Q 20/3674 713/171 |
| 2004/0266427 A1* | 12/2004 | Kurokawa | H04W 88/08 455/426.2 |
| 2005/0152305 A1* | 7/2005 | Ji | H04L 45/54 370/328 |
| 2005/0192013 A1* | 9/2005 | Perrot | H04L 12/4625 455/445 |
| 2005/0223111 A1* | 10/2005 | Bhandaru | H04L 12/4604 709/236 |
| 2005/0260973 A1* | 11/2005 | van de Groenendaal | H04L 63/102 455/411 |
| 2007/0038743 A1* | 2/2007 | Hellhake et al. | 709/224 |
| 2007/0091871 A1* | 4/2007 | Taha | H04L 49/3009 370/352 |
| 2007/0097919 A1* | 5/2007 | Tsubota | H04L 29/12028 370/331 |
| 2007/0121529 A1* | 5/2007 | Meier | 370/256 |
| 2007/0153741 A1* | 7/2007 | Blanchette et al. | 370/331 |
| 2007/0189306 A1* | 8/2007 | Xu | 370/395.51 |
| 2007/0189308 A1 | 8/2007 | Tchigevsky et al. | |
| 2007/0248065 A1* | 10/2007 | Banerjea et al. | 370/338 |
| 2007/0248067 A1* | 10/2007 | Banerjea | H04L 45/26 370/338 |
| 2007/0291707 A1* | 12/2007 | Fischer | H04L 69/08 370/338 |
| 2008/0069024 A1* | 3/2008 | Iino | H04L 12/4633 370/313 |
| 2008/0159230 A1* | 7/2008 | Cho | H04W 36/0011 370/331 |
| 2008/0205385 A1* | 8/2008 | Zeng | H04L 45/00 370/389 |
| 2008/0225853 A1* | 9/2008 | Melman et al. | 370/392 |
| 2008/0291846 A1* | 11/2008 | Lu | 370/254 |
| 2008/0304456 A1* | 12/2008 | Iino | H04L 12/2856 370/338 |
| 2009/0028121 A1* | 1/2009 | Kinoshita | H04L 45/16 370/338 |
| 2009/0086663 A1* | 4/2009 | Ho et al. | 370/328 |
| 2009/0190522 A1* | 7/2009 | Horn | H04W 40/248 370/315 |
| 2009/0274054 A1* | 11/2009 | Wakumoto | H04L 12/462 370/242 |
| 2009/0285190 A1* | 11/2009 | Baron | H04L 12/2867 370/338 |
| 2009/0310528 A1* | 12/2009 | Tamura | 370/315 |
| 2010/0027516 A1* | 2/2010 | Nagarajan | 370/338 |
| 2010/0177712 A1* | 7/2010 | Kneckt | H04W 76/023 370/329 |
| 2011/0162060 A1* | 6/2011 | Vijayakumar | H04L 12/413 726/13 |
| 2011/0243058 A1* | 10/2011 | Yamada | H04B 7/155 370/315 |
| 2011/0292921 A1* | 12/2011 | Hunter | H04L 45/74 370/338 |
| 2012/0026996 A1* | 2/2012 | Yamaguchi | H04B 1/406 370/338 |
| 2012/0030735 A1* | 2/2012 | Sato | 726/5 |
| 2012/0051346 A1* | 3/2012 | Herbert et al. | 370/338 |
| 2012/0079567 A1* | 3/2012 | Van De Groenendaal | H04L 63/102 726/4 |
| 2012/0087315 A1* | 4/2012 | Sivaprakasam | H04W 8/26 370/329 |
| 2012/0155395 A1* | 6/2012 | Yadav et al. | 370/329 |
| 2013/0103836 A1* | 4/2013 | Baniqued et al. | 709/226 |

OTHER PUBLICATIONS

IEEE Standard for Information technology—Telecommunications and information exchange between systems Local and metropolitan area networks—Specific requirements Part 11: Wireless LAN Medium Access Control (MAC) and Physical Layer (PHY) Specifications; Mar. 29, 2012; pp. 0, 1-91, 382-384, 404, 413-417, 964-972-1413-1422, 2646-2695.

European Patent Office; European Search Report; EP Application No. 13002459.9; Oct. 28, 2013; 4 pgs.

* cited by examiner

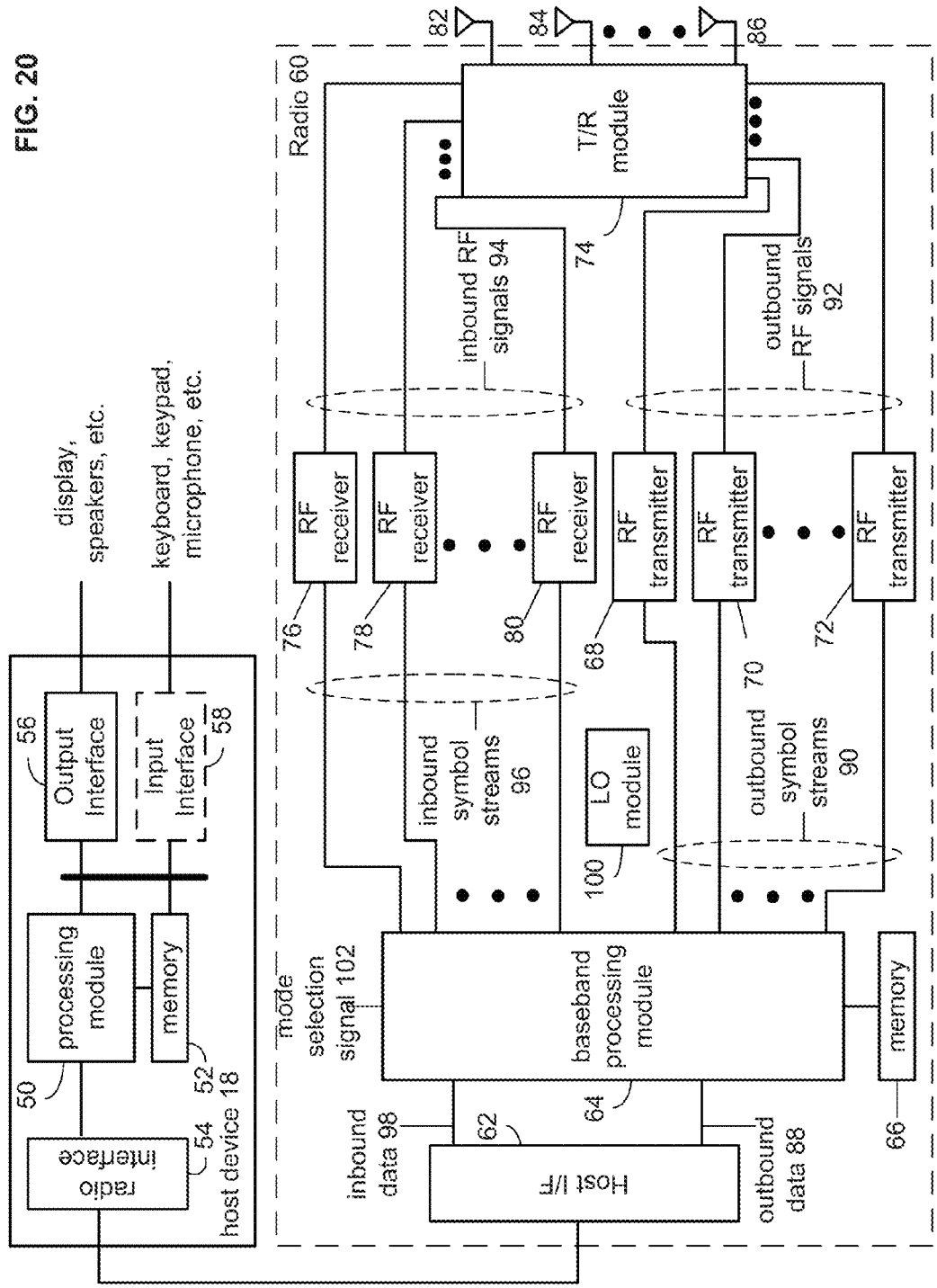

SYSTEM AND METHOD FOR WIRELESS STATION BRIDGING

CROSS REFERENCE TO RELATED PATENTS

The present U.S. Utility patent application claims priority pursuant to 35 U.S.C. §119(e) to the following U.S. Provisional Patent Application which are hereby incorporated herein by reference in their entirety and made part of the present U.S. Utility patent application for all purposes:
1. U.S. Provisional Application Ser. No. 61/646,417, filed May 14, 2012, pending.
2. U.S. Provisional Application Ser. No. 61/809,505, filed Apr. 8, 2013, pending.

BACKGROUND OF THE INVENTION

Technical Field of the Invention

The invention relates generally to communication systems; and, more particularly, it relates to bridging functionality in a basic service set of a wireless local area network.

Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x. In one network topology of an IEEE 802.11x network, an access point controls communication between one or more stations. Wire lined communication systems may operate in accordance with one or more physical layer standards including, but not limited to, MoCA, G.hn, powerline communications, optical communications, DSL, DOCSIS, etc. At the data link layer, Media access control (MAC) protocol is a layer 2 transport technology that is used ubiquitously in local area networks (LAN), enterprise networks, metropolitan networks, etc., to communicate between different nodes, computers and networks in both wireless and wire lined communication systems.

Typically, in a basic service set of an IEEE 802.11x network, only the access point is operable to bridge with nodes in another network, such as MoCA, G.hn, powerline type networks, other wireless networks, etc., using layer 2 protocols. This limits the possible topologies and range of IEEE 802.11 networks.

BRIEF DESCRIPTION OF THE SEVERAL VIEWS OF THE DRAWINGS

FIG. 20 illustrates a schematic block diagram of an embodiment of a wireless device in more detail.

DETAILED DESCRIPTION OF THE INVENTION

Figure 1:
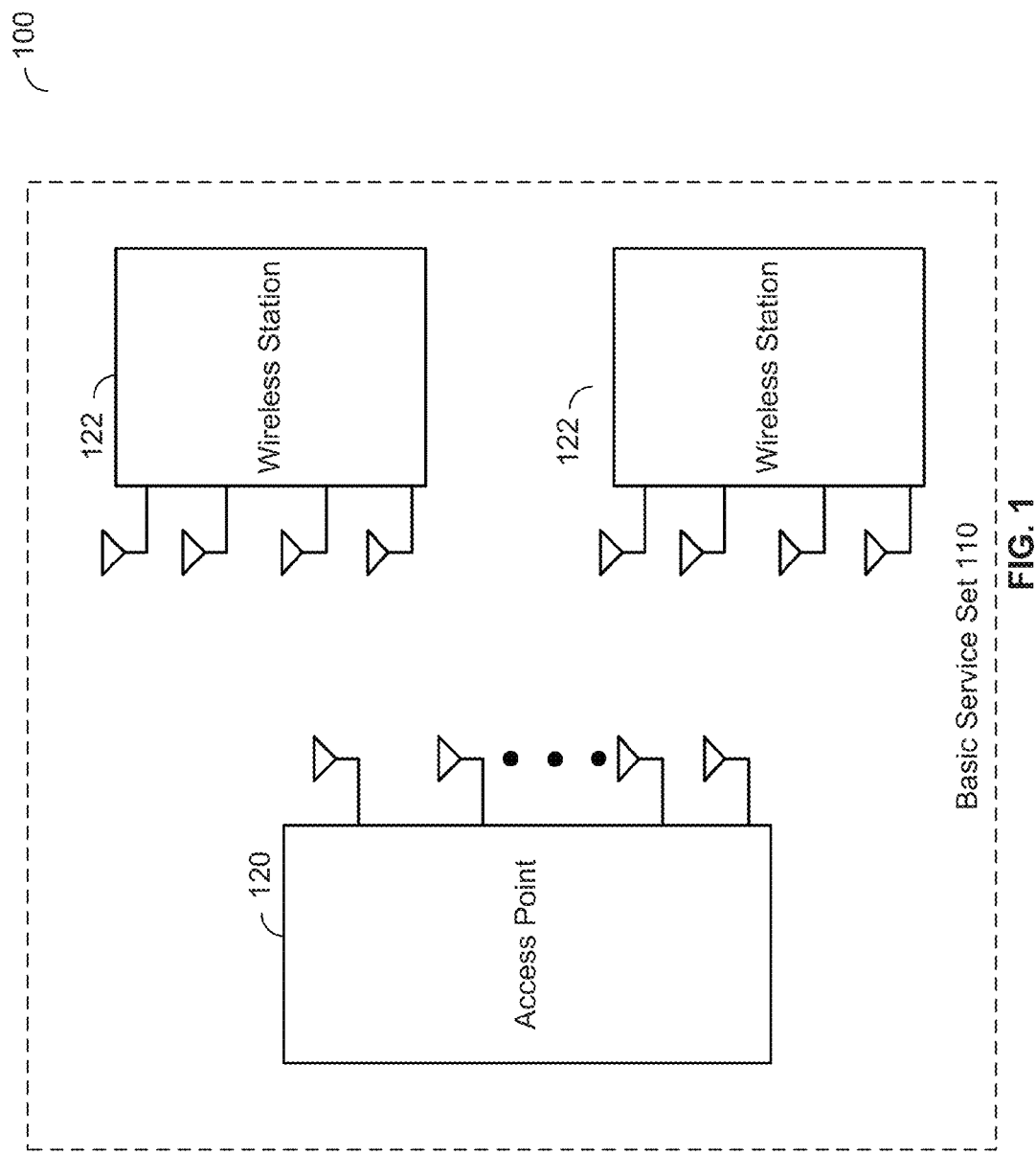
FIG. 1 illustrates a schematic block diagram of an embodiment of a basic service set in a wireless network.

The following IEEE standards/draft standards are hereby incorporated herein by reference in their entirety and are made part of the present U.S. patent application for all purposes:

IEEE Std 802.11—2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, Sponsored by the LAN/MAN Standards Committee, IEEE Std 802.11™-2012, (Revision of IEEE Std 802.11-2007), 2793 total pages (incl. pp. i-xcvi, 1-2695).

IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 total pages (incl. pp. i-xxxii, 1-502).

IEEE Draft P802.11-REVmb™/D12, November 2011 (Revision of IEEE Std 802.11™—2007 as amended by IEEE Std 802.11k™-2008, IEEE Std 802.11r™-2008, IEEE Std 802.11y™-2008, IEEE Std 802.11w™-2009, IEEE Std 802.11n™-2009, IEEE Std 802.11p™—2010, IEEE Std 802.11z™-2010, IEEE Std 802.11v™-2011, IEEE Std 802.11u™—2011, and IEEE Std 802.11s™—2011), "IEEE Standard for Information technology—Telecommunications and information exchange between systems—Local and metropolitan area networks—Specific requirements; Part 11: Wireless LAN Medium Access Control (MAC) and Physical Layer (PHY) Specifications," Prepared by the 802.11 Working Group of the LAN/MAN Standards Committee of the IEEE Computer Society, 2910 total pages (incl. pp. i-cxxviii, 1-2782).

IEEE P802.11ac™/D2.1, March 2012, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338).

IEEE P802.11ad™/D6.0, March 2012, (Draft Amendment based on IEEE P802.11REVmb D12.0), (Amendment to IEEE P802.11REVmb D12.0 as amended by IEEE 802.11ae D8.0 and IEEE 802.11aa D9.0), "IEEE P802.11ad™/D6.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," Sponsor: IEEE 802.11 Committee of the IEEE Computer Society, IEEE-SA Standards Board, 664 total pages.

IEEE Std 802.11ae™—2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11ae™—2012, (Amendment to IEEE Std 802.11™-2012), 52 total pages (incl. pp. i-xii, 1-38).

IEEE P802.11af™/D1.06, March 2012, (Amendment to IEEE Std 802.11REVmb™/D12.0 as amended by IEEE Std 802.11ae™/D8.0, IEEE Std 802.11aa™/D9.0, IEEE Std 802.11ad™/D5.0, and IEEE Std 802.11ac™/D2.0), "Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 140 total pages (incl. pp. i-xxii, 1-118).

IEEE 802.1D Standard for Local and metropolitan area networks: Media Access Control (MAC) Bridges, 2004 edition.

IEEE 802.1Q-2011 and IEEE 802.1Q-2012, entitled "IEEE Standard for Local and metropolitan area networks—Media Access Control (MAC) Bridges and Virtual Bridge Local Area Networks," 2011 and 2012 edition.

IEEE 802.3xx Standards for Ethernet based LANs, issued from the IEEE 802.3 Working Group between 1973 and 2012, including IEEE 802.3-12 issued in 2012 as a revision of the base standard incorporating 802.3 at/av/az/ba/bc/bd/bf/bg amendments.

MoCA MAC/PHY v1.0 specification, February 2006 and MOCA MAC/PHY v2.0 specification, June 2010.

ITU Recommendation G.9960, G.9961 G.hn/HomeGrid, Oct. 9, 2009 and ITU Recommendation G. 9954 HomePNA3.1, January 2007.

FIG. 1 illustrates a schematic block diagram of an embodiment of a basic service set 110 in a wireless network 100, such as a wireless network compliant with an IEEE 802.11 protocol (including IEEE 802.11a, b, g, n) or other type of wireless network protocol. In an embodiment, the basic service set (BSS) 110 includes an access point 120 and one or more wireless stations 122.

Various configuration and topologies for the basic service set 110 are possible in the wireless network 100, such as an independent basic service set (IBSS), Quality of Service Basic service set (QBSS), extended service set (ESS), etc. For example, in an Independent Basic Service Set (IBSS), the wireless stations 122 are wirelessly connected in a peer-to-peer fashion. The wireless stations 122 communicate directly with each other though some wireless stations 122 may not be able to communicate with every other station due to the range limitations. There are no relay functions in an IBSS therefore stations need to be within range of each other to communicate directly.

An Infrastructure Basic Service Set is a basic service set topology with an Access Point (AP). The access point provides a relay function for the BSS. The wireless stations 122 in the BSS 110 communicate with the access point 120, and frames are relayed between wireless stations 122 by the access point 120. This relay function increases the range of the BSS 110. A basic service set identification (BSSID) uniquely identifies a BSS (the SSID however, can be used in multiple, possibly overlapping, BSSs). In an infrastructure BSS, the BSSID is the MAC address of the wireless access point (AP). In an IBSS, the BSSID is a locally administered MAC address generated from a 46-bit random number.

The AP 120 and wireless stations 120 in an embodiment of the basic service set 110 of FIG. 1 is compatible with any number of communication protocols and/or standards, e.g., IEEE 802.11(a), IEEE 802.11(b), IEEE 802.11(g), IEEE 802.11(n), as well as other protocols and functions described herein. In an embodiment, AP 120 supports backwards compatibility with prior versions of the IEEE 802.11x standards as well. In another embodiment, AP 120 supports communications with the wireless stations 122 using channel bandwidths, MIMO dimensions, and at data throughput rates supported by a current version of IEEE 802.11n operating standards or future versions of IEEE 802.11x standard or other similar protocols and standards. In an embodiment, AP 120 supports simultaneous communications with more than one of the wireless stations 122. Simultaneous communications may be serviced via OFDM tone allocations (e.g., certain number of OFDM tones in a given cluster), MIMO dimension multiplexing, or via other techniques. With some simultaneous communications, AP 120 may allocate one or more of the multiple antennae thereof respectively to support communication with each wireless station 122, for example.

In current 802.11 operating standards, wireless stations (STA) 122 are end devices without capability to bridge to external networks. This lack of bridging limits the topologies of current basic service sets to "stub networks" and prevents an AP-STA wireless link to be used as a connecting path (backbone) between other networks. For example, in currently defined IEEE 802.11 networks, a wireless path between two devices (AP-STA, STA-AP-STA or STA-STA) is currently not able to act as a connection link between a node of an external network and the basic service set 110. Though partial solutions exist to overcome this lack of bridging functionality, these solutions are proprietary only and limited to certain type of traffic or/and based on Layer 3 protocols (such as IP Multicast to MAC Multicast translation, NAT—Network Address Translation). Accordingly, there is a need for wireless stations 122 (e.g. stations operating in accordance with IEEE 802.11x or similar types of wireless local area network standards/protocols) in a basic service set 110 to have bridging functionality to nodes of external networks using a layer 2 protocol.

One or more embodiments for a layer 2 wireless station (STA) bridging mode of operation are described for a basic service set 110 herein. In a STA bridging mode of operation, a wireless station in a basic service set (BSS) 110 is able to form a layer 2 bridge to one or more nodes in an external network.

Figure 2:
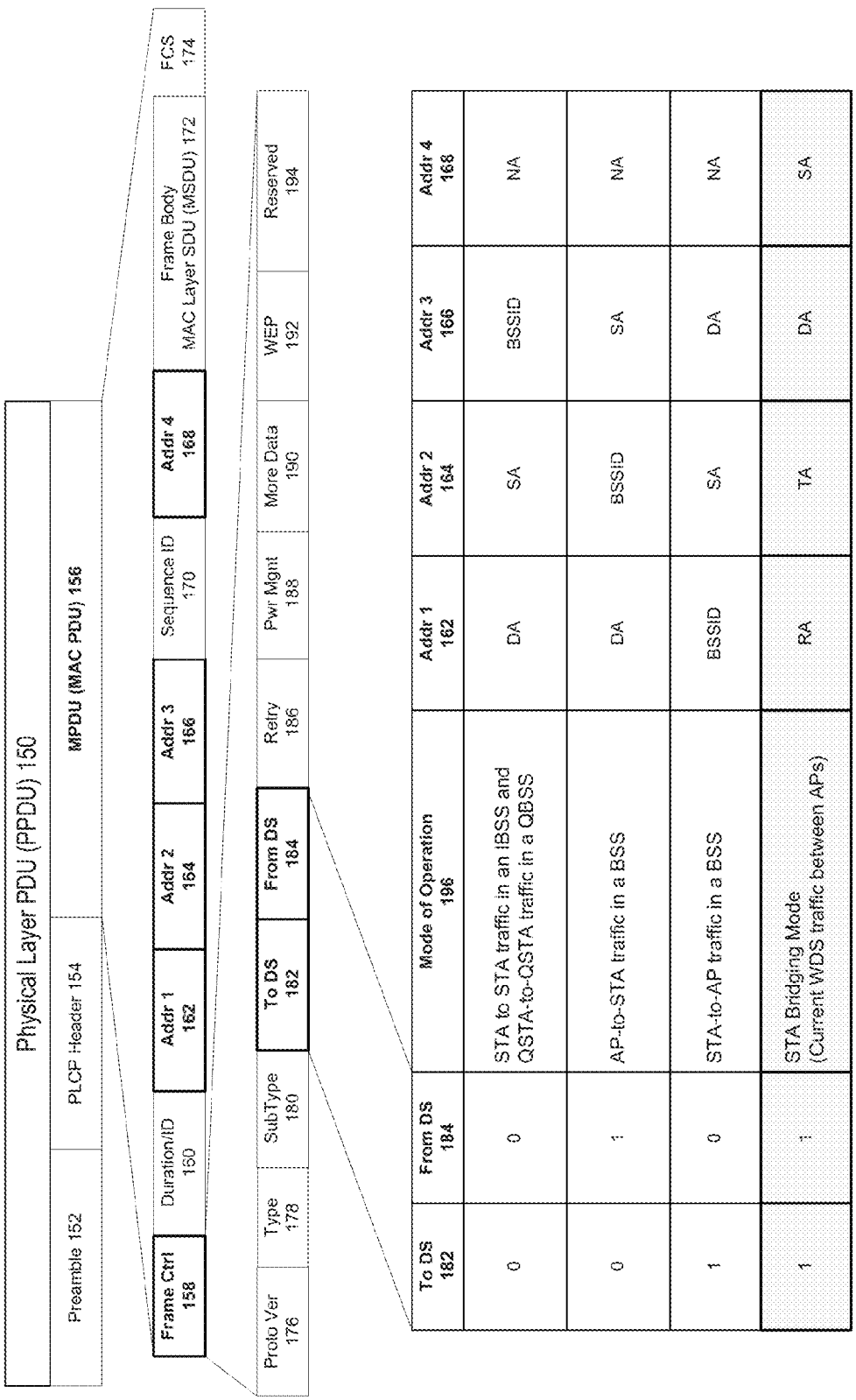
FIG. 2 illustrate a schematic block diagram of an embodiment of a format of a physical layer protocol data unit (PPDU).

FIG. 2 illustrates an embodiment of a format of a physical layer protocol data unit (PPDU) 150 that includes an indication of a STA bridging mode of operation. The PPDU 150 includes a preamble 152, PLCP header 154 and media access control (MAC) protocol data unit (MPDU) 156 in the payload portion of the PPDU 150. The MPDU 156 is a layer 2 data link layer frame included in the PPDU 150 payload that is exchanged between layer 2 logical entities (data link layer) in the AP 120 and STAs 122 of the wireless network 100. The MPDU 156 in an embodiment includes a MAC-level service data unit (MSDU) 172 encapsulated in the MPDU 156 frame body. In an embodiment, the MSDU 172 is generated at layer 2, e.g. from a logical link control (LLC) sub-layer in a protocol stack.

Generally, three types of MPDU 156 frames are defined: management, control, and data frames. The data frames generally include a MAC-level service data unit (MSDU) 172, whereas management and control frames do not. In this example, the MPDU 156 is a data frame and includes at least one MSDU 172 encapsulated in the MPDU 156 data frame though a plurality of MSDUs 172 may be aggregated into a single MPDU 156 data frame in an embodiment as well. Other types of MPDUs 156, such as management and control, may also be implemented as described herein. The MPDU 156 includes the following exemplary fields: Frame Control 158, Duration/ID 160, Address1 162, Address2 164, Address3 166, Sequence ID 170, Address4 168 and Frame Check Sequence (FCS)174. The frame control field 158 of MPDU 156 includes various fields, such as for example, prototype version 176, type 178, subtype 180, to data source (ToDS) 182, from data source (FromDS) 184, Retry 186, Power Management 188, More Data 190, Wired Equivalent Privacy bit key (WEP) 192 and reserved bits 194. The following table provides further explanation of fields in an example MPDU 156. Other fields or additional fields or similar fields may also be implemented in an MPDU 156 in embodiments herein to provide the same or similar functions.

| Field | Description |
|---|---|
| Frame Control | Protocol version.<br>Type<br>Subtype<br>To DS. 1 = to the distribution system.<br>From DS. 1 = exit from the Distribution System.<br>More Frag. 1 = more fragment frames to follow (last or unfragmented frame = 0)<br>Retry. 1 = this is a re-transmission.<br>Power Mgt. 1 = station in power save mode, 1 = active mode.<br>More Data. 1 = additional frames buffered for the destination address (address x).<br>WEP. 1 = data processed with WEP algorithm. 0 = no WEP.<br>Order. 1 = frames must be strictly ordered. |
| Duration ID | For data frames = duration of frame. For Control Frames the associated identity of the transmitting station. |
| Address 1 | Source address (6 bytes). |
| Address 2 | Destination address (6 bytes). |
| Address 3 | Receiving station address (destination wireless station) |
| Sequence ID | Sequence Number increments by one after each user-specified interval of new frames |
| Address 4 | Transmitting wireless station. |
| WEP | Wired Equivalent Privacy cipher key for encryption of payload |
| FCS | Frame Check Sequence (32 bit CRC). defined in P802.11. |

The ToDS 182 and FromDS 184 fields (described above in the Frame Control Field 158 of the MPDU 156) define four modes of operation. The first mode of operation (when ToDS=0 and FromDS=0) indicates station to station traffic in an independent basic service set (IBSS) (also called an Ad-Hoc network with peer-to-peer communications) or QSTA to QSTA traffic in a QoS enhanced basic service set (QBSS). The second mode of operation (when ToDS=0 and FromDS=1) includes an access point (AP) as a relay in a basic service set and indicates AP to station traffic. The third mode of operation (when ToDS=1 and FromDS=0) includes an AP as a relay in a basic service set (BSS) and indicates station to AP traffic. In these first three modes of operation, three addresses are used: the BSSID, the designated MAC address of the sending station and the designated MAC address of the destination station.

Currently, when ToDS=1 and FromDS=1 in an MPDU 156, a Wireless Distribution System (WDS) mode is defined by the IEEE 802.11 operating standards. The WDS mode of operation supports a wireless link between two access points in different basic service sets. When a WDS link is set up between two access points, four available address fields in a MAC header are used: the source address of the originating station (SA), the destination address of the receiving station (DA), the MAC address of the originating access point (TA) and the MAC address of the receiving access point (RA).

In an embodiment, as shown in FIG. 2, another mode of operation, called a wireless station (STA) bridging mode of operation, is defined for a basic service set when ToDS=1 and FromDS=1 (e.g., rather than the WDS mode of operation). Though the STA bridging mode of operation is described herein as indicated when ToDS=1 and FromDS=1, other fields or additional fields or parameters in PPDU 150 may be used alternatively or in addition to this method to indicate a STA bridging mode of operation. These modifications to the current 802.11 operating standards are exemplary. Other fields, frames, modifications or additions may be implemented in the 802.11 operating standards to perform similar STA bridging functions described herein. In addition, a wireless network may implement STA bridging functions described herein in a proprietary operating mode without modifications to the current 802.11 operating standards.

In a STA bridging mode of operation, the wireless stations 122 of the basic service set 110 are able to bridge at Layer 2 to one or more nodes in other external networks. In an embodiment described herein, the basic service set 110 is logically modeled as a virtual distributed bridge 200. AP 120 of the basic service set 110 logically functions as the control plane of the virtual distributed bridge and performs forwarding functions of the virtual distributed bridge while the one or more wireless stations (STAs) 122 of the BSS 110 logically function as ports of the virtual distributed bridge. In another embodiment for STA bridging mode of operation described herein, the wireless links in the basic service set 110 are logically modeled as point to point links between ports of logical hybrid bridges comprising the AP/wireless stations and connected bridges. In this point to point embodiment, AP 120 of the BSS 110 logically functions as the Control Plane of the BSS 110 for certain management purposes.

Figure 3:
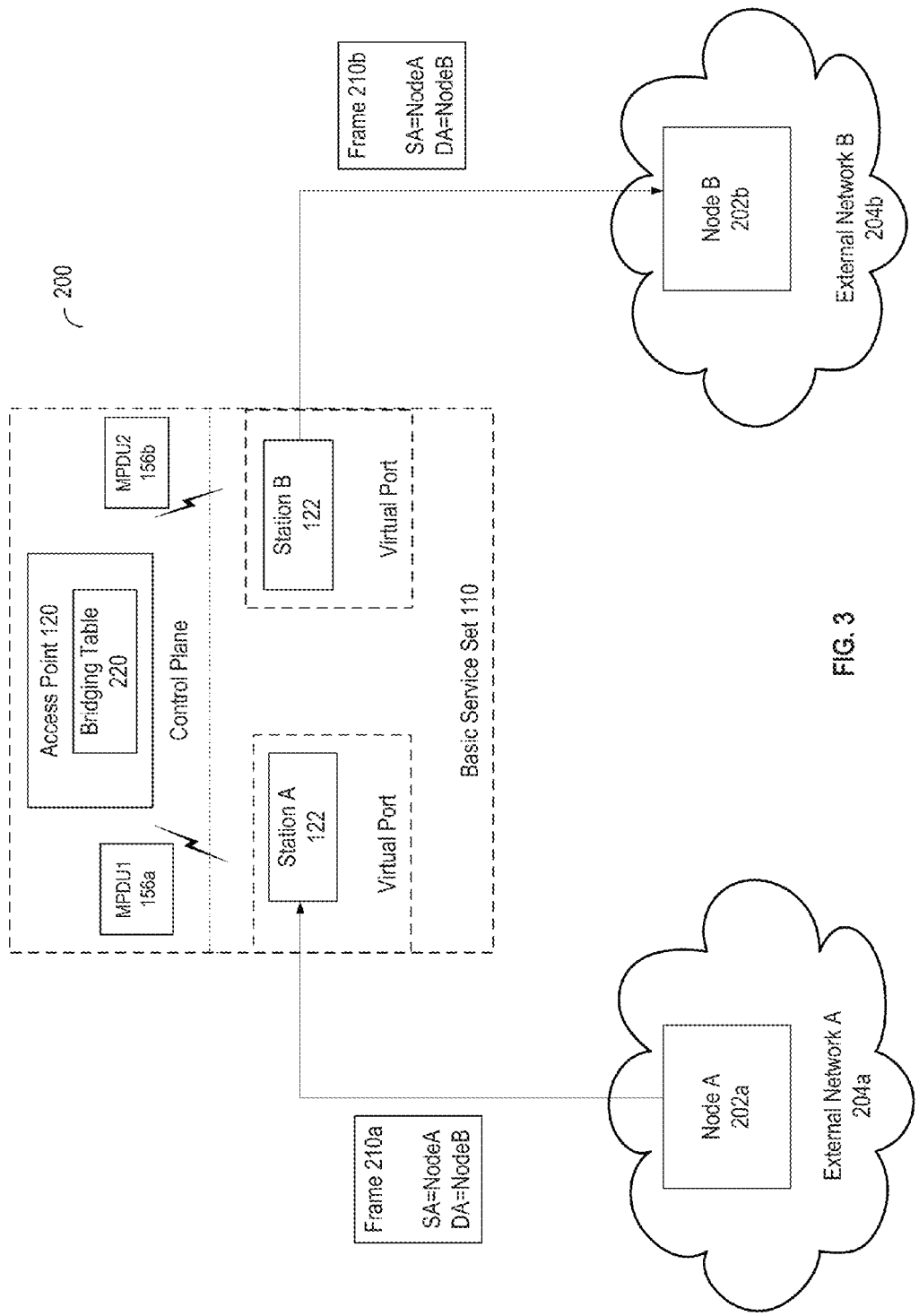
FIG. 3 illustrates a schematic block diagram of an embodiment of a STA bridging mode of operation in a basic service set 110.

FIG. 3 illustrates a schematic block diagram of an embodiment of a STA bridging mode of operation in a basic service set 110. In this embodiment, the basic service set 110 emulates a virtual distributed bridge 200 wherein the wireless stations 122 are logical ports of the virtual distributed bridge 200 and AP 120 emulates the control plane of the virtual distributed bridge 200 and performs forwarding functions. Node A 202a and/or Node B 202b in FIG. 3 are nodes in one or more external networks 204 and are not considered part of the basic service set 110. For example, Node A 202a and/or Node B 202b are nodes in an external network 204, such as a wireline network, Multimedia over Coax Alliance (MoCA) compliant network, Ethernet compliant local area network, G.hn compliant home network, etc. In an embodiment, Node A and/or Node B are connected to wireless station A 122 and wireless station B 122 respectively using a wireline medium, such as a power line, phone line, coaxial cables, fiber optic cable, etc. In another embodiment, Node A and/or Node B are nodes in one or more external wireless networks using a wireless connection to wireless station A 122 and wireless station B 122, respectfully. For example, Node A and/or Node B may be nodes in an external network 240, such as a cellular telephone system, IEEE 802.11 network, Bluetooth network, or other type of radio frequency based network. Node A and Node B may include for example networking devices in homes and/or enterprises, such as a set top box, TV, personal computer, laptop, server, game console, tablet, smart phone, or other type of processing device.

In operation, Node A 202a in external network A 204a transmits a first frame 210a, (e.g. layer 2 Ethernet frame or layer 3 IP packet) with a destination MAC address (DA=NodeB) of Node B 202b and a source MAC address (SA=NodeA) of Node A 202a from external network A 204a over a wireline or wireless connection to station A 122 in basic service set 110. Station A 122 receives the frame 210a over a network interface and translates or encapsulates the frame 210a into a first MPDU (MPDU1) 156a. MPDU1 156a indicates a STA bridging mode of operation (e.g., ToDS=1 and FromDS=1) and includes the source MAC address of Node A and the destination MAC address of Node B. Station A 122 transmits MDPU1 156a to AP 120 over a wireless interface in the basic service set 110.

AP 120 retrieves the destination MAC address of Node B from MPDU1 156 and uses a bridging table 220 to determine an egress wireless station 122. The bridging table 220 is similar to a MAC address look up table except that the table lists a set of MAC addresses and associated wireless stations 122 in the basic service set 110. AP 120 populates the bridging table 220 with learned destination MAC addresses and associated bridging wireless stations 122. AP 120 determines the associated bridging wireless station 122 for the destination MAC address from the bridging table 220 and generates a second MPDU (MPDU2) 156b. MPDU2 156b indicates a STA bridging mode of operation (e.g., ToDS=1 and FromDS=1) and includes the source MAC address of Node A and the destination MAC address of Node B. AP 120 transmits MPDU2 156b to the bridging station B 122.

Station B 122 receives MPDU2 156b and accesses the destination MAC address of Node B. Station B 122 determines a network interface associated with the destination MAC address of Node B. Station B 122 then generates a frame 210b (e.g. layer 2 Ethernet frame or layer 3 IP packet) that includes the source MAC address of Node A and the destination MAC address of Node B and transmits the frame 210b to Node B over the network interface. The wireless stations 122 of the basic service set 110 are thus able to bridge at Layer 2 to Nodes A and B in external networks 204.

Figure 4A:
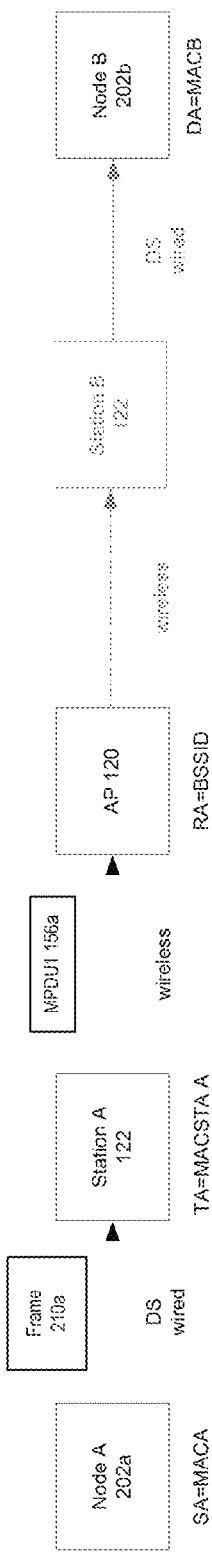
FIGS. 4A-C illustrate schematic block diagrams of one or more embodiments for a method of generation of MPDUs in a STA bridging mode of operation.
Figure 4B:
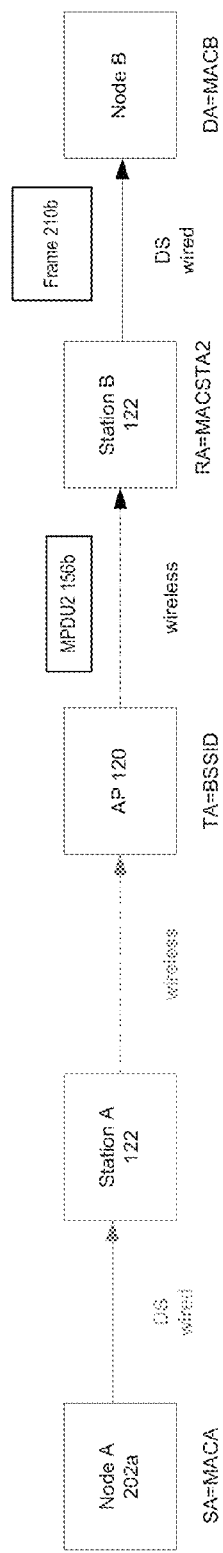
Figure 4C:
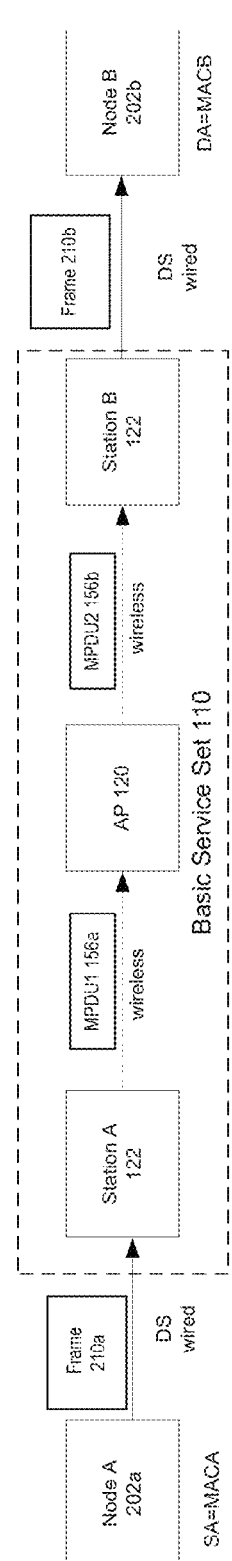

FIGS. 4A-C illustrate schematic block diagrams of one or more embodiments for a method of generation of MPDUs 156 in a STA bridging mode of operation in more detail. Again, in this embodiment, the basic service set 110 emulates a virtual distributed bridge 200 wherein the wireless stations 122 are logical ports of the virtual distributed bridge 200 and AP 120 emulates the control plane of the virtual distributed bridge 200 and performs forwarding functions. In operation, as shown in FIG. 4A, Node A 202 in an external network 204 transmits a frame 210a (e.g. layer 2 Ethernet frame or layer 3 IP packet) with a destination MAC address of Node B and a source MAC address of Node A to Station A 122. Station A 122 translates or encapsulates the frame 210a into a MSDU 172 in a frame body of MPDU1 156a. MPDU1 156a indicates a STA bridging mode of operation (such as, e.g., setting ToDS=1 and FromDS=1). MPDU1 156a also includes the destination MAC address of Node B (e.g., DA in ADDR3 field 166) and the source MAC address of Node A (SA in ADDR4 field 168) as well as the MAC address of Station A as the Transmit Address (TA in ADDR2 field 164) and the BSSID (or MAC address) of AP 120 as the Receive Address (RA in ADDR1 field 162). When MPDU1 156a is received by AP 120 with an indication of a bridging mode of operation (e.g., ToDS=Set and FromDS=Set), AP performs a lookup of the destination MAC address (DA) in the bridging table 160 to determine the MAC address of the wireless station 122 bridging the destination, in this example Station B 122.

As shown in FIG. 4C, AP 120 then generates MPDU2 156b. MPDU2 indicates a STA bridging mode of operation and includes the destination MAC address of Node B (DA in ADDR3 field 166) and the source MAC address of Node A (SA in ADDR4 field 168) as well as the MAC address of Station B as the Receive Address (RA in ADDR1 field 162) and the BSSID (or MAC address) of AP 120 is the Transmit Address (TA in ADDR2 field 164).

When MPDU2 156b is received by Station B 122 with an indication of STA bridging mode of operation (e.g., ToDS=Set and FromDS=Set), Station B 122 extracts the destination MAC address of Node B (DA in ADDR3 field 166) and the source MAC address of Node A (SA in ADDR4 field 168) and identifies a network interface corresponding to the destination address. Station B translates the MPDU2 into an appropriate layer 2 or layer 3 frame for Node B (e.g. MSDU, Ethernet frame, etc.) that includes the destination MAC address of Node B and the source MAC address of Node A. As shown in FIG. 4C, Station B 122 then transmits the frame 210*b* to Node B over the identified network interface.

Figure 5:
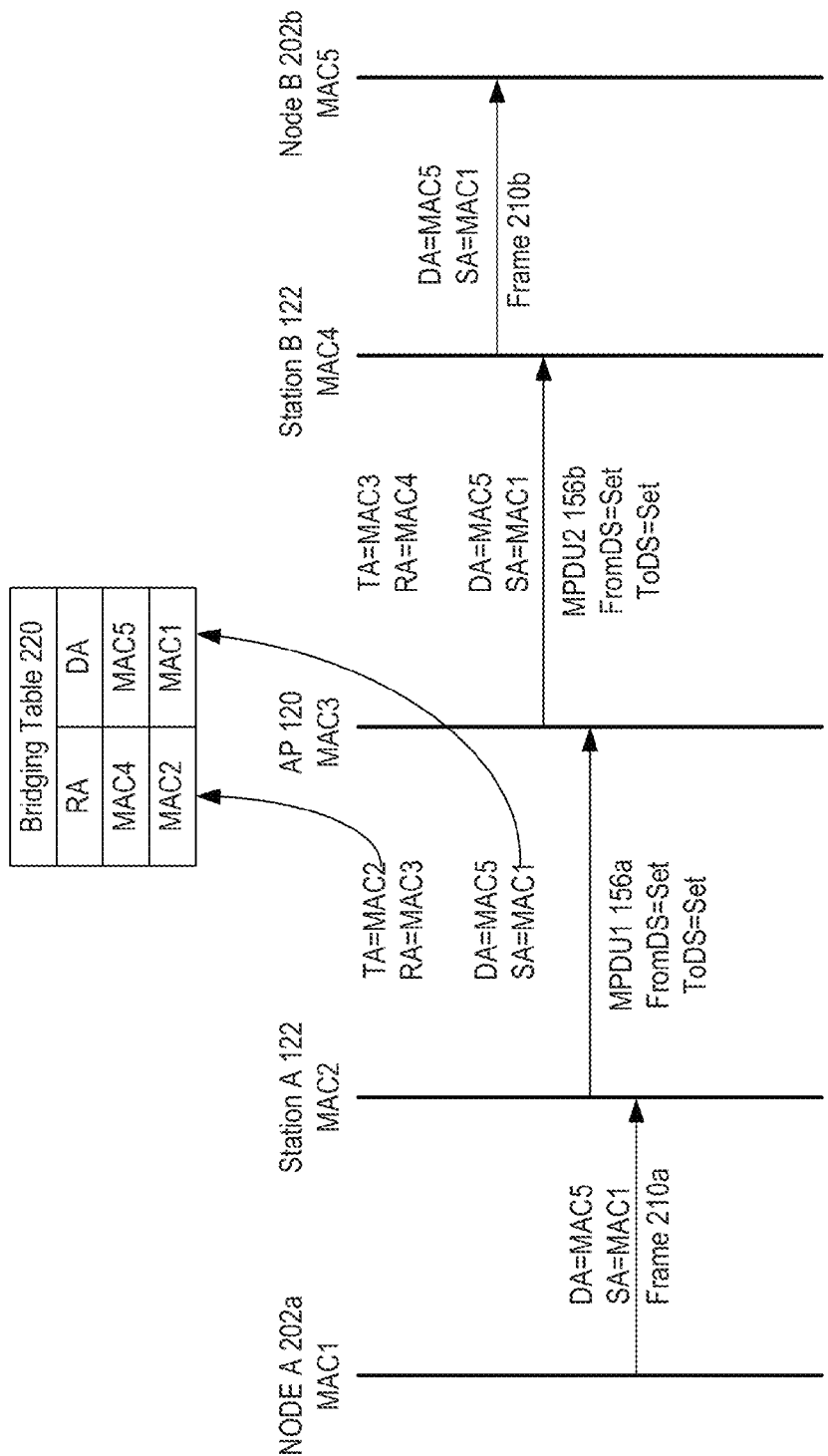
FIG. 5 illustrates a schematic block diagram of an embodiment of a method for MAC address learning.

FIG. 5 illustrates a schematic block diagram of an embodiment of a method for MAC address learning to populate bridging table 220 by AP 120. In this embodiment, the basic service set 110 emulates a virtual distributed bridge 200 wherein the wireless stations 122 are logical ports of the virtual distributed bridge 200 and AP 120 emulates the control plane of the virtual distributed bridge 200 and performs forwarding functions. When AP 120 receives a MPDU from a station in STA Bridging Mode of Operation, it is operable to populate the bridging table 160, listing the source MAC address of an external node (SA in ADDR4 field 168) with the associated MAC address of the bridging wireless station (TA in ADDR2 field 164). In the example of FIG. 5, Station A 122 receives a frame 210 with a source MAC address for Node A 202*a*. Station A 122 transmits MPDU1 156*a* to AP 120 listing the source MAC address for Node A 202*a* and inserting its MAC address as the transmitting address. The AP 120 may thus determine that Station A is a bridging station for source MAC address of Node A. It then populates the Bridging Table 160 with destination address of Node A as being associated with RA of the MAC address of bridging wireless station A. As such, AP 120 populates the bridging table 160 with a set of destination MAC addresses and associated bridging wireless stations 160 as it receives MPDUs in a STA bridging mode of operation. In an embodiment, a MAC address entry in the bridging table may expire or age out when the AP 120 fails to receive an MPDU or other type of frame with the MAC address after a pre-configured period of time.

When AP 120 receives an incoming MPDU 156 either with a destination unicast MAC address not listed in the bridging table 220, e.g. an unknown destination MAC address or a Multicast MAC Address, AP 120 in an embodiment is operable to transmit a broadcast MPDU 156 to one or more wireless stations 122 in the basic service set 110. AP 120 retains the same Sequence ID 170 as in the incoming MPDU in the broadcast MPDU. As such, the broadcast MPDU has the same Sequence ID 170 as the incoming MPDU with the unknown destination MAC address or Multicast MAC Address.

When a receiving wireless station 122 receives an MPDU with an indication of a STA bridging mode of operation and the DA is a Multicast or Broadcast Address, the receiving wireless station 122 determines whether the MPDU Sequence ID 170 matches any of the Sequence IDs of the latest MPDUs generated by the wireless station 122. In case of a match, the wireless station 122 discards the MPDU. A match indicates that the wireless station 122 transmitted the original MPDU with the unknown destination address to AP 120, and so the wireless station 122 discards the MPDU to avoid loops. Otherwise, when the Sequence ID 170 is not a match, the wireless station 122 extracts the source MAC address and destination MAC address (SA,DA) from the MPDU and transmits a frame with the SA,DA over one or more network interfaces to nodes bridged by the wireless station 122.

Figure 6:
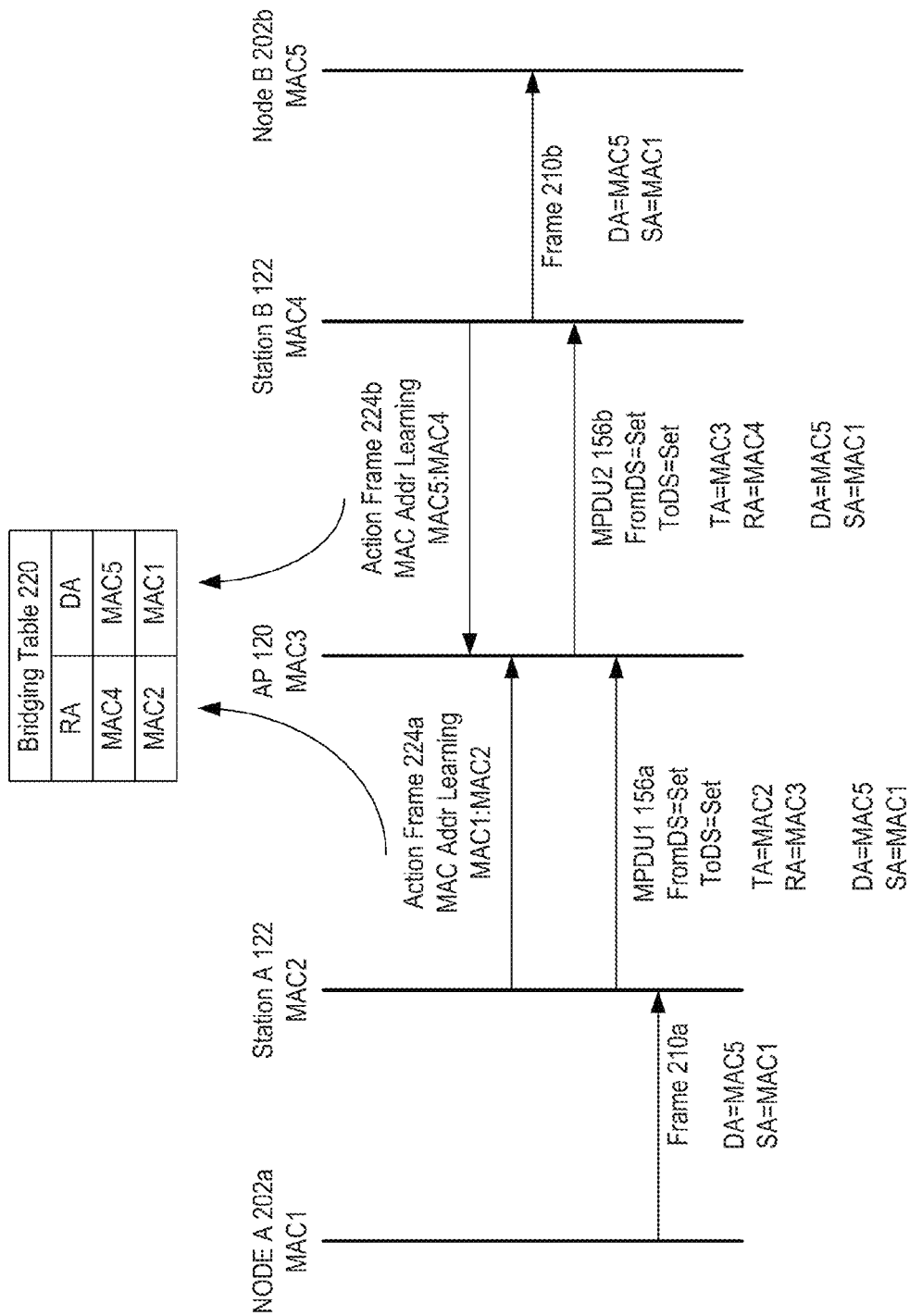
FIG. 6 illustrates a schematic block diagram of another embodiment of a method for MAC address learning.

FIG. 6 illustrates another embodiment of a method for MAC address learning to populate bridging table 220 by AP 120. When a wireless station 122 in a basic service set 110 receives an ingress frame over a network interface from a node 202 of an external network 204, the wireless station 122 determines whether a source address in the ingress frame 202 is new or newly received within a predetermined time period, such as a Unicast or Multicast MAC address. When the source MAC address is new (or newly received within a predetermined time period), the wireless station 122 generates an action frame 224 to AP 120 to advertise the new MAC address to the AP 120. The action frame 224 is defined herein and called a Bridged Address Advertisement action frame. The action frame 24 includes the following fields: action value, destination MAC address and MAC address of the wireless station bridging to the node with the destination MAC address. The action value is set to parameter to indicate a bridged address advertisement action frame.

When AP 120 receives a Bridged Address Advertisement Action Frame 224, it is operable to populate the bridging table 220, listing the destination MAC address with the MAC address of the bridging wireless station. By receiving Bridged Address Advertisement action frames 224 from various wireless stations 122 in the basic service set 110, AP 120 populates the bridging table 220 with a set of destination addresses and associated bridging wireless stations. In an embodiment, a MAC address entry in the bridging table may expire or age out when the AP fails to receive an MPDU or action frame 224 with the MAC address after a pre-configured period of time.

As described herein, the communication of MPDUs in STA bridging mode of operation are indirect. AP 120 is a relay for MPDUs 156 in a STA bridge mode of operation. When a station 122 receives an incoming frame 210, it generates an MPDU 156 to the AP 120 with a source MAC address and destination MAC address. The AP 120 generates another MDPU 120 and transmits it to the wireless bridging station 122 associated with the destination MAC address. The communication between the bridging STAs is thus indirect with the AP 120 as a relay.

Figure 7:
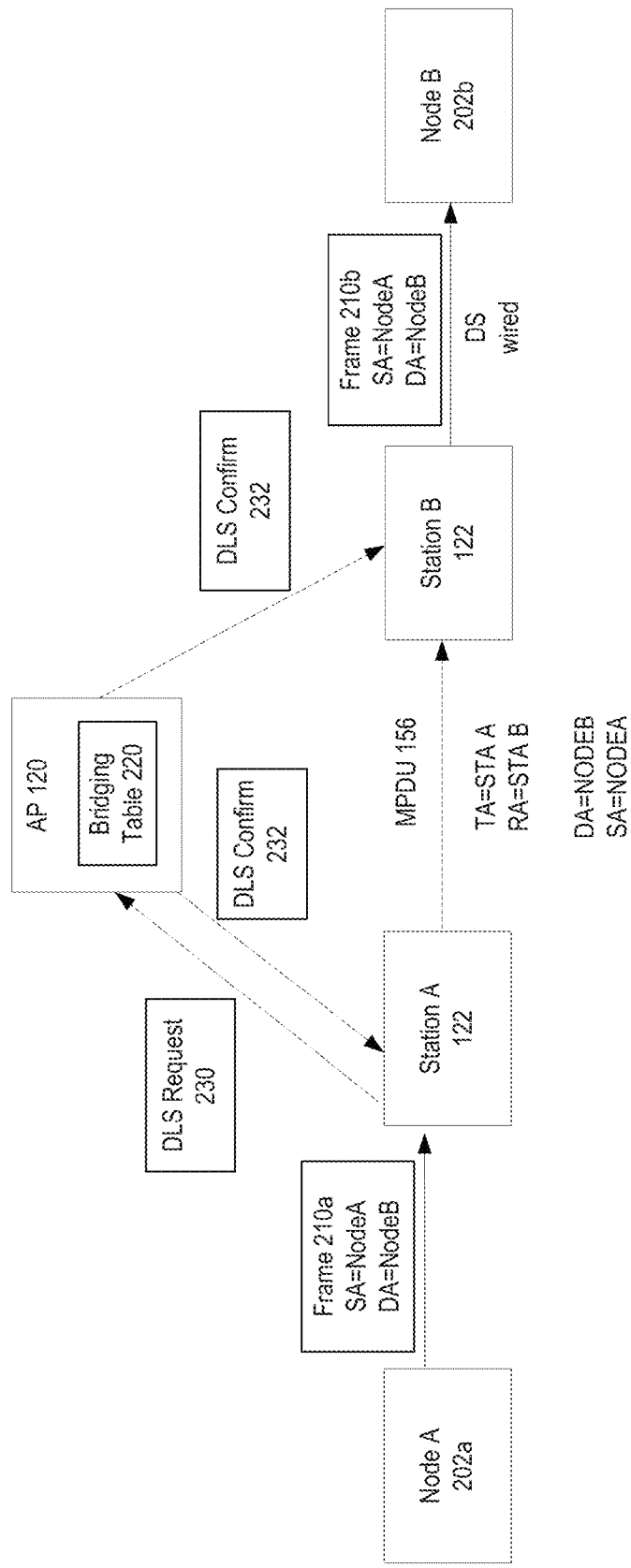
FIG. 7 illustrates a schematic block diagram of an embodiment of STA bridging mode of operation with direct communication.

FIG. 7 illustrates a schematic block diagram of an embodiment of STA bridging mode of operation with direct communication. In this embodiment, the STA bridging functionality is employed in a basic service set 110 using a mesh type configuration with direct link setup (DLS). In direct link setup, direct station-to-station frame transfer occurs within the basic service set 110 without using AP 120 as a relay. For STA bridging mode of operation in a direct communication configuration, the ingress station A 220 generates a DLS request frame 230 to AP 120 to request a direct communication link. The DLS request frame 230 includes at least the destination MAC address (DA). When AP 120 receives the DLS request frame 230 from Station A 220, AP 120 is operable to determine the bridging wireless station 220 associated with the destination MAC Address from the bridging table 220. AP 120 returns a DLS confirm frame 232 to Station A that includes the MAC address of the bridging wireless station 220 (Station B in the example of FIG. 7). AP 120 may also generate a DLS confirm 232 message to Station B 122 to notify Station B of the direct link setup.

Station A then transmits an MPDU 156 directly to Station B 122 for bridging to Node B. The MPDU 156 from Station A to Station B indicates a STA bridging mode of operation (e.g., ToDS=1, FromDS=1) and includes the source MAC address of Node A, the destination MAC address of node B, the receiving station MAC address (RA of Station B) and the transmitting station MAC address (TA of Station A).

In an embodiment the DLS request is a MAC Sublayer Management Entity-Bridged Direct Link Setup request (MLME-BDLS). The DLS request frame includes, e.g., the destination MAC address, a timeout value and response timeout value. In an embodiment, the associated DLS confirm frame includes, e.g., the MAC address of the bridging station for the destination MAC address, result code, capability information, timeout value and supported rates.

In an embodiment, a beacon management frame and probe response frame are implemented to advertise the STA bridging mode capability between AP 120 and wireless stations 122 in the basic service set 110. In an embodiment, the STA bridging mode capability of AP 120 is advertised in a BSS Bridging Element parameter of a Beacon Management frame periodically broadcasted by AP 120 and in a Probe Response Management Frame in response to a Probe Request from a wireless station 122.

Figure 8:
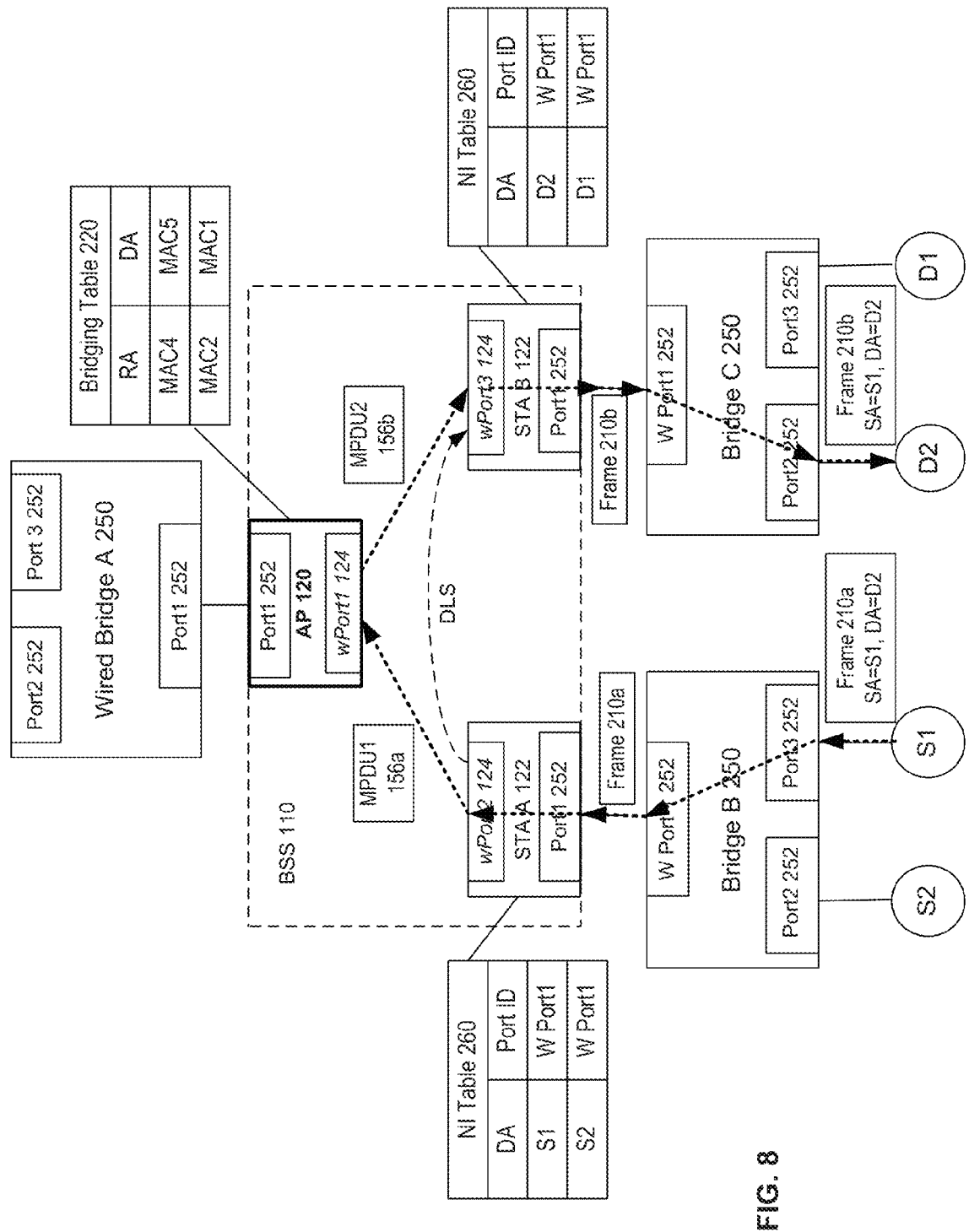
FIG. 8 illustrates a schematic block diagram of an embodiment of a basic service set in a STA bridging mode of operation.

FIG. 8 illustrates a schematic block diagram of an embodiment of a basic service set in a STA bridging mode of operation. In this embodiment, the basic service set 110 emulates a virtual distributed bridge 200. AP 120 is the forward entity of the virtual distributed bridge and is operable to forward frames between wireless stations 122 in the basic service set based on its learned mapping in bridging table 220. In this example of FIG. 8, ports 252 are Ethernet type ports, such as IEEE 802.3 compliant Ethernet ports. Though only one port 252 is illustrated for stations 122, Station A and Station B may include additional ports 252. Ports 252 interface to bridges 250 in external networks, e.g. over a wireline connection. Bridges 250 are Ethernet type bridges operable to forward frames based on layer 2 addressing.

In operation, the wireless stations 122 are operable to perform address learning as frames are received over ports 252 to populate network interface tables 260. For example, in FIG. 8, Station A 122 receives Frame 210a that includes SA=S1, DA=D2 over port1 252. Based on frame 210a, Station A 122 is operable to populate or update network interface table 260 with port ID of port1 252 associated with the source address of S1. In the embodiment of a distributed bridge model for STA bridging mode of operation, AP 120 is the forward entity of the virtual distributed bridge and is operable to forward frames between wireless stations 122, e.g. Station A is not operable to learn Station B bridges a node with DA=D2. As such, Station A converts frame 210 into MPDU1 156 for forwarding by AP 120 to the bridging station. Station A transmits MPDU1 156 over wireless port (wPort) 124. The processing to map frame 210 into MPDU1 156 and perform quality of service and queuing for transmission over wPort 124 are discussed in more detail herein.

AP 120 receives MPDU1 and is operable to determine the bridging wireless station 122 associated with the destination MAC Address from the bridging table 220. AP 120 transmits MPDU2 156 to Station B 122 with SA=S1, DA=D2. Station B 122 is operable to retrieve the destination address from MPDU2 and determine the associated egress port 252 from the network interface table 260. Station B converts MPDU2 156 into frame 210b and performs quality of service and queuing for transmission over port1 252 as discussed in more detail herein.

Figure 9:
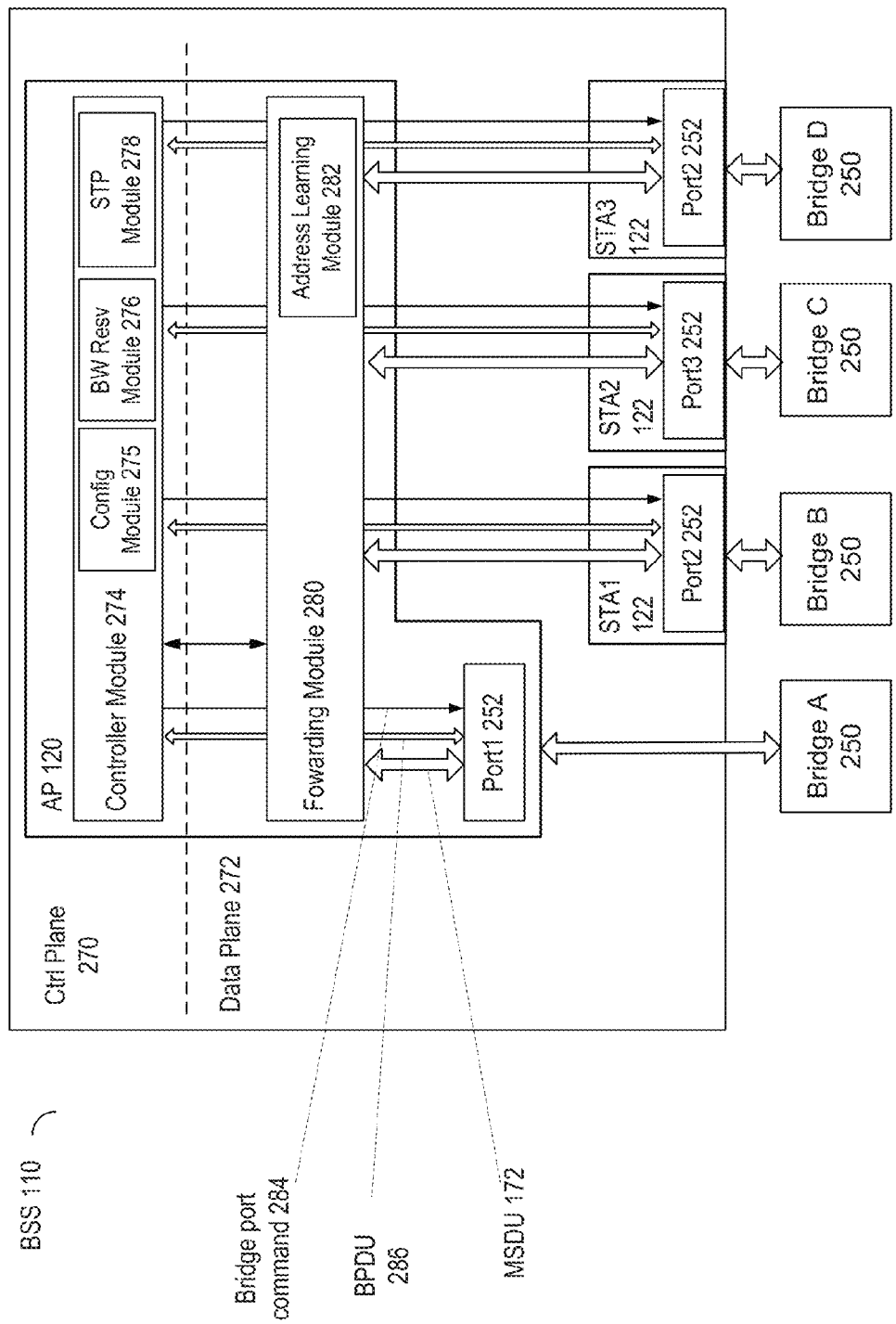
FIG. 9 illustrates a schematic block diagram of an embodiment of basis service set 110 as a virtual distributed bridge.

FIG. 9 illustrates a schematic block diagram of an embodiment of basis service set 110 as a virtual distributed bridge. AP 120 includes control plane 270 of the virtual distributed bridge and provides forwarding functions. Controller module 274 in AP 120 is operable to provide one or more layer 2 bridge protocols or network functions for the virtual distributed bridge. For example, controller module 274 includes configuration module 275, bandwidth reservation module 276 and spanning tree module 278. Spanning tree module 278 is operable to perform spanning tree protocol to determine loops in the basic service set 110 and determine one or more wireless ports 124 to block for loop prevention. Bandwidth reservation (BW Resv) module 276 provides quality of service functions to reserve bandwidth for certain traffic flows through the basic service set 110. Configuration (Config) module 275 tracks changes in the wireless network topology.

Controller module 274 issues bridge protocol data units (BPDU) 286 to the wireless stations 122 acting as "virtual ports" in the distributed bridge model. The BDPUs 286 include configuration BPDUs for Spanning Tree Protocol (STP), Topology Change Notification (TCN) BPDU for announcing changes in the network topology, and Topology Change Notification Acknowledgment (TCA) BPDUs for tracking network changes. Bridge port commands 284 are also issued by the controller module 274 to start and stop forwarding at ports 252 or perform other port configurations. As discussed in more detail herein, the bridge port commands 284 may be implemented as action frames. MAC-level service data unit (MSDU) 172 (included in MPDUs 156) are forwarded between the wireless stations 122 and converted to frames 210 prior to transmission from ports 252. The forwarding module 280 performs forwarding functions between the wireless stations 122 and ports 252. Address learning module 252 is operable to control learning of bridging stations 122 and their associated destination addresses for populating bridging table 220.

Figure 10:
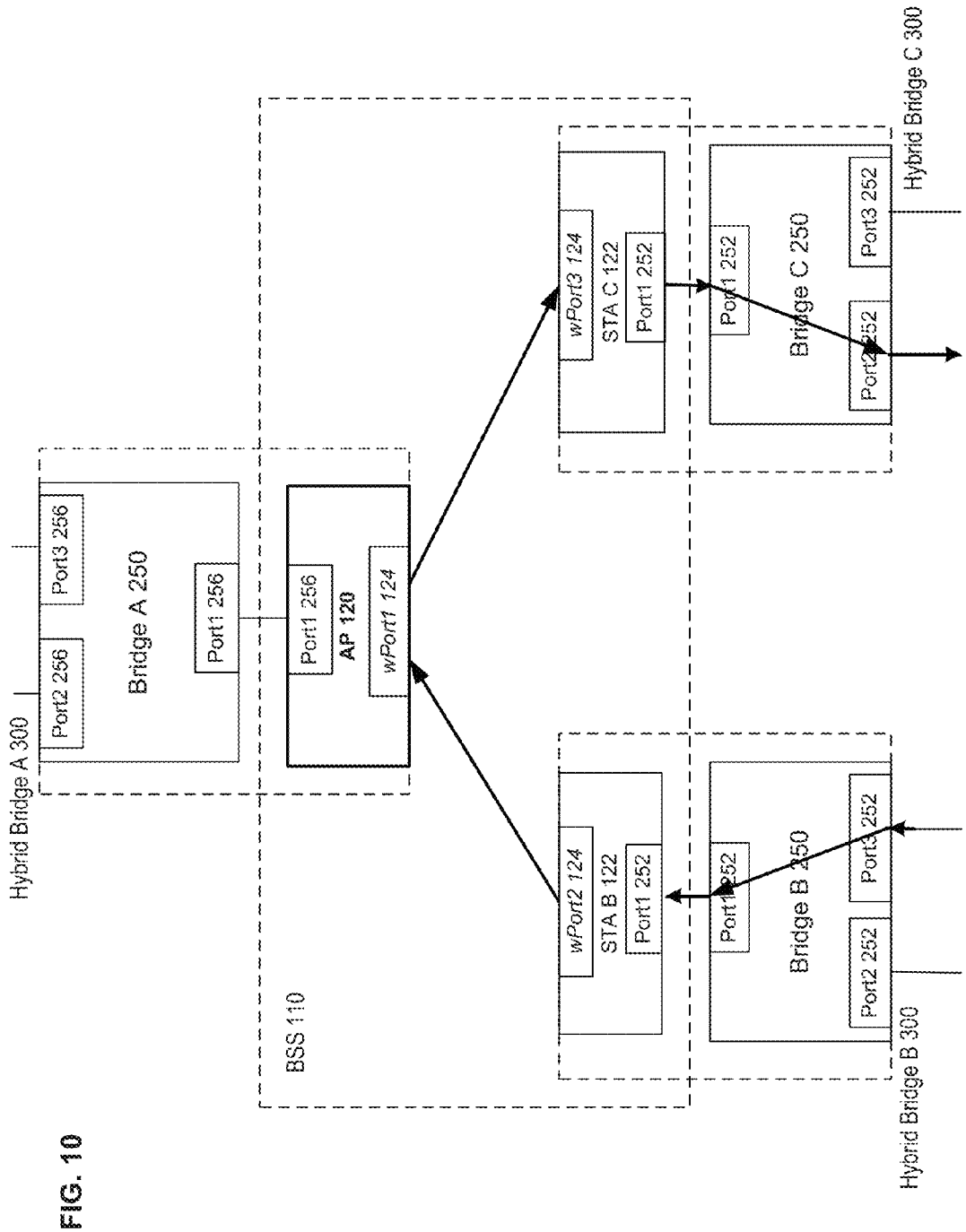
FIG. 10 illustrates a schematic block diagram of an embodiment of a basic service set 110 in a STA bridging mode of operation in a point to point model.

FIG. 10 illustrates a schematic block diagram of an embodiment of a basic service set 110 in a STA bridging mode of operation in a point to point model. In this embodiment, the wireless stations 122 of the basic service set 110 are still able to bridge at Layer 2 to one or more nodes in other external networks. However, the wireless links in the basic service set 110 are logically modeled as point to point links between ports of logical hybrid bridges 300. A hybrid bridge 300 logically comprises an AP 120 or wireless station 122 and its connected bridge 250. A virtual wireless port 124 is dynamically created for each wireless link of a wireless station 122 and assigned its own unique MAC address in the basic service set 110.

In the point to point model for STA mode of operation, AP 120 is not operable to perform forwarding functions and populate a bridging table 220. Instead, the connected bridges 250 include forwarding tables. The forwarding tables map the MAC addresses of virtual wireless ports 302 for the wireless stations 122 and associated destination addresses.

Figure 11:
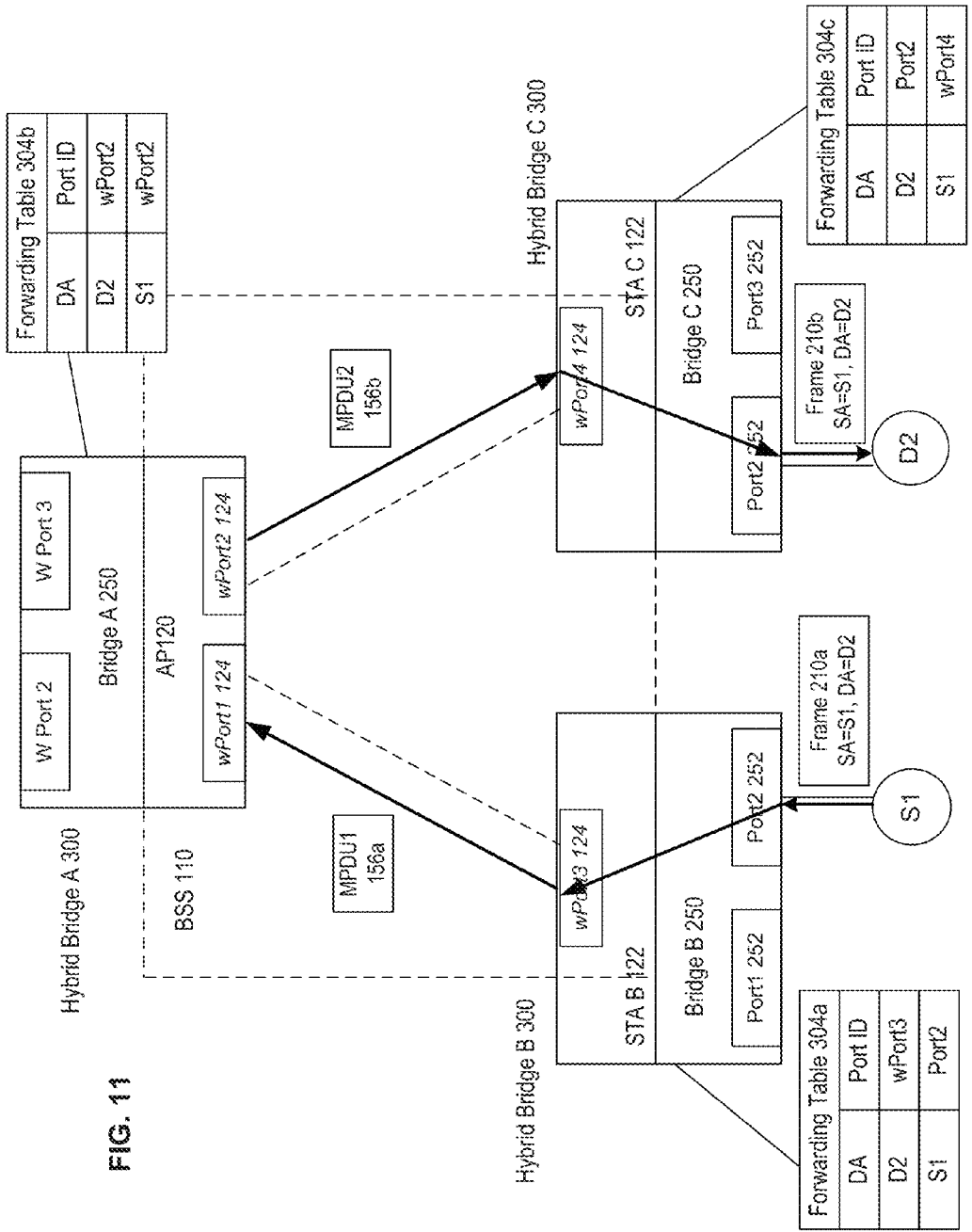
FIG. 11 illustrates a schematic block diagram of an embodiment of a method of operation for STA bridging mode of operation in a point to point model.

FIG. 11 illustrates a schematic block diagram of an embodiment of a method of operation for STA bridging mode of operation in a point to point model. FIG. 11 illustrates the wireless stations 122 or AP 120 and connected bridges 250 as logical hybrid bridges 300. In the point to point model of STA bridging operation, the bridges 250 as part of logical hybrid bridges 300 are operable to perform address learning to populate forwarding tables 304. When MPDUs 156 are received over a virtual wireless port 124 of a wireless station 122, the bridges 250 learn the source addresses accessible from the virtual wireless ports 124. These addresses and the associated virtual wireless ports 124 are mapped into the forwarding tables 304.

In a STA mode of operation, in an example shown in FIG. 11, hybrid bridge B 300 receives a frame 210a with SA=S1 and DA=D2. Hybrid bridge B 300 accesses forwarding table 304a and determines the associated wireless port wPort3. The hybrid bridge B 300 transmits the frame 210 to wireless port wPort3 (via Ethernet ports 252 connecting a bridge 250 to a wireless station 122 in the hybrid bridge 300). The frame 210 is mapped to a MPDU1 156a with SA=S1 and DA=D2 and an indication of STA bridging mode of operation (e.g, ToDS=1, FromDS=1). In direct wireless communication, MPDU1 is transmitted to Hybrid Bridge A 300 via wPort1 of AP 120. Hybrid bridge A 300 accesses the destination address of D2 and determines the egress virtual wireless port wPort2 from forwarding table 304*b*. Hybrid Bridge A transmits MPDU2 with SA=S1 and DA=D2 and an indication of STA bridging mode of operation (e.g, ToDS=1, FromDS=1) over wireless port wPort2 to Hybrid Bridge C 300 via wireless port wPort4 of wireless station C 122. Hybrid Bridge C 300 accesses the destination address of D2 and determines the egress port Port2 from forwarding table 304*c*. MPDU2 is mapped to Frame 210*b* with SA=S1 and DA=D2 and transmitted over Port2.

Figure 12:
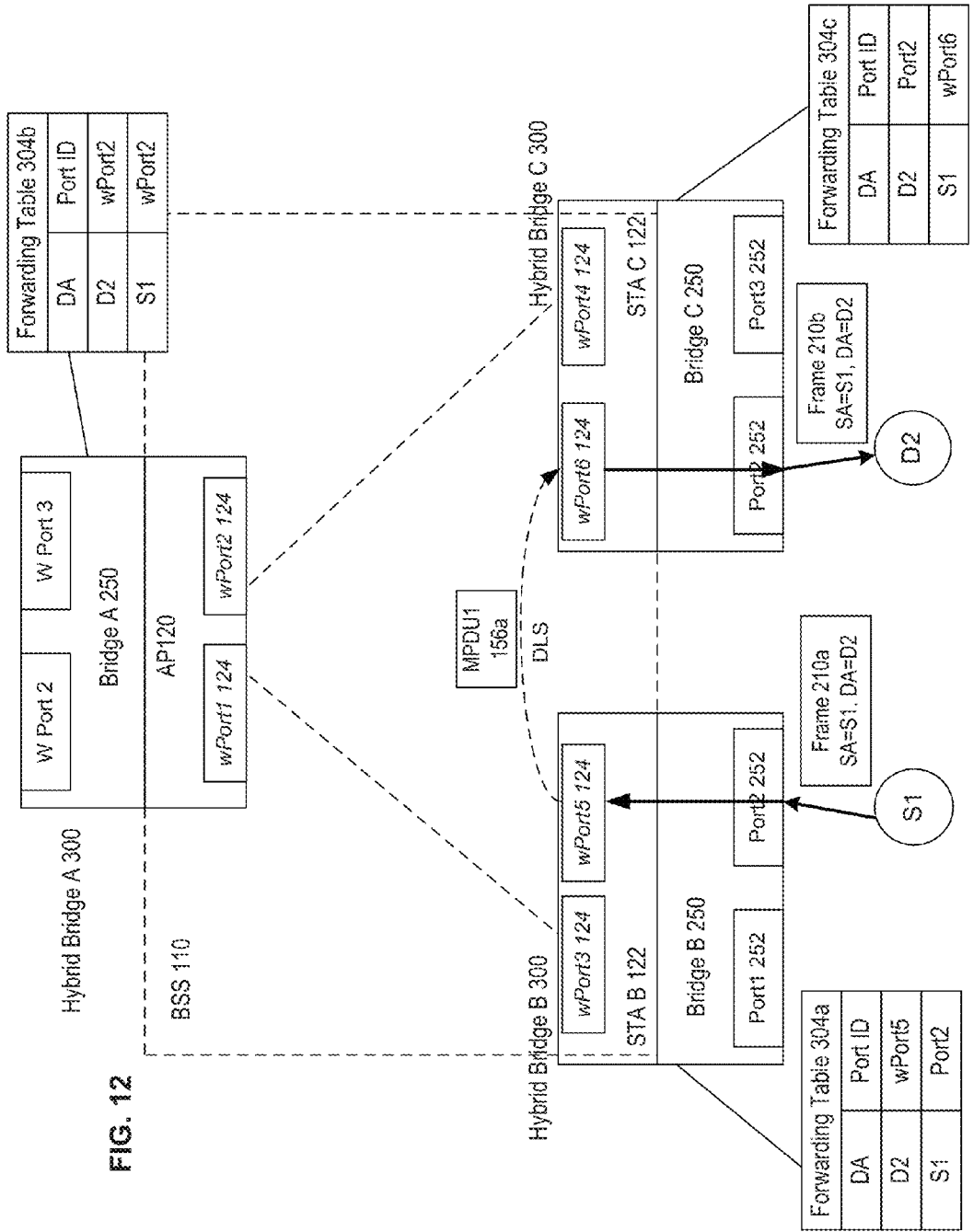
FIG. 12 illustrates a schematic block diagram of an embodiment of STA bridging mode of operation in a point to point model with direct link setup.

FIG. 12 illustrates a schematic block diagram of an embodiment of STA bridging mode of operation in a point to point model with direct link setup. In a point to point model, to support direct link setup, new virtual wireless ports must be created for the new direct link. For example, assuming in FIG. 12 that a direct link is established between the wireless stations 122 and AP 120 as described with respect to FIG. 7, to maintain integrity in the forwarding tables 304, new virtual ports wPort5 in Station B and wPort6 in Station C are dynamically created with unique MAC addresses to support the direct link. The new virtual ports affect the mapping of the forwarding tables 304 (e.g, in comparison to indirect communication shown in FIG. 11). For example, forwarding Table 304*a* of Hybrid Bridge B 300 now indicates that destination address D2 is accessible through virtual wireless port wPort5. And Forwarding Table 304*c* now indicates that destination 51 is accessible through virtual wireless port wPort6. Thus, in the point to point model, direct link set up between two wireless stations 122 requires dynamic creation of new virtual wireless ports with unique MAC addresses for the direct link.

A problem in the point to point model for STA bridging mode of operation is that the wireless stations 122 still require control by AP 120 in a basic service set 110 for establishment and configuration of wireless links, including authentication, encryption, bit rate selection, bandwidth management, metrics, etc. In an embodiment, AP 120 maintains control of one or more management functions in the point to point model and logically functions as the Control Plane of the BSS 110 for those management functions.

Figure 13:
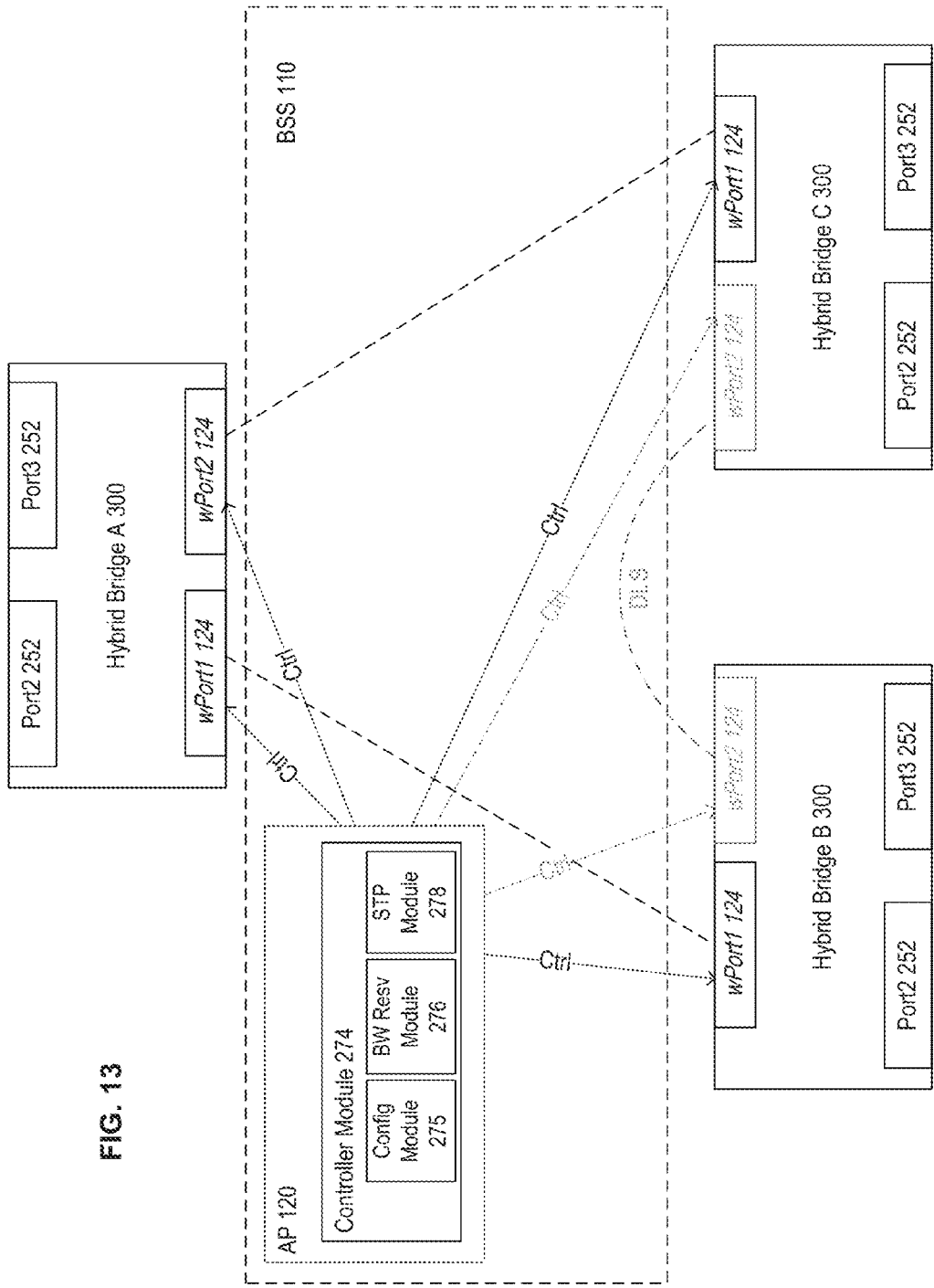
FIG. 13 illustrates a schematic block diagram of an embodiment of an access point with control of one or more management functions in a point to point model of STA bridging mode of operation.

FIG. 13 illustrates a schematic block diagram of an embodiment of AP 120 with control of one or more management functions in a point to point model of STA bridging mode of operation. In an embodiment, AP 120 is operable to manage wireless links in the basic service set 110. For example, AP 120 includes a controller module 274 operable to control establishment of wireless links, establishment of direct links between wireless stations (e.g., DLS), encryption setup of wireless links, bit rate selection of wireless links, bandwidth management between wireless links, performance metrics, etc. AP 120 may be operable to perform other IEEE 802.11 functions relating to management, control or configuration of the wireless resources and wireless stations 122 in the basic service set 110.

AP 120 may also manage either alone or with direction from connected bridge 250, one or more layer 2 bridge protocols or network functions as well. For example, AP 120 may include one or more of configuration module 275, bandwidth reservation module 276 and spanning tree module 278. Bandwidth reservation (BW Resv) module 276 provides quality of service functions to reserve bandwidth for certain traffic flows through the basic service set 110. Configuration (Config) module 275 tracks changes in the wireless network topology.

Spanning tree module 278 is operable to perform one or more spanning tree protocol processes to detect loops in the basic service set 110 and determine one or more wireless ports 124 to block for loop prevention. For example, in a point to point model, a multicast or broadcast frame may be transmitted from a receiving wireless station 122 to AP 120. In response thereto, AP 120 multicasts the frame to wireless stations 122 in the basic service set 110. The receiving wireless station 122 should not multicast the frame to its other ports or loops may occur. To avoid loops, AP 120 manages a spanning tree protocol to determine loops in the basic service set 110. AP 120 is operable to issue commands to wireless stations 122 to "block" egress traffic from one or more virtual wireless ports 124 (similarly as an Ethernet bridge port is placed in "block" state in response to STP) to prevent loops. In an embodiment, AP 120 issues bridge protocol data units (BPDU) 286 to the wireless stations 122 in the point to point model. In another embodiment, AP 120 issues action frames to control the wireless stations 122. For example, AP 120 may issue an action frame to command a given wireless station 122 to "block" egress traffic from one or more wireless ports 124.

Figure 14:
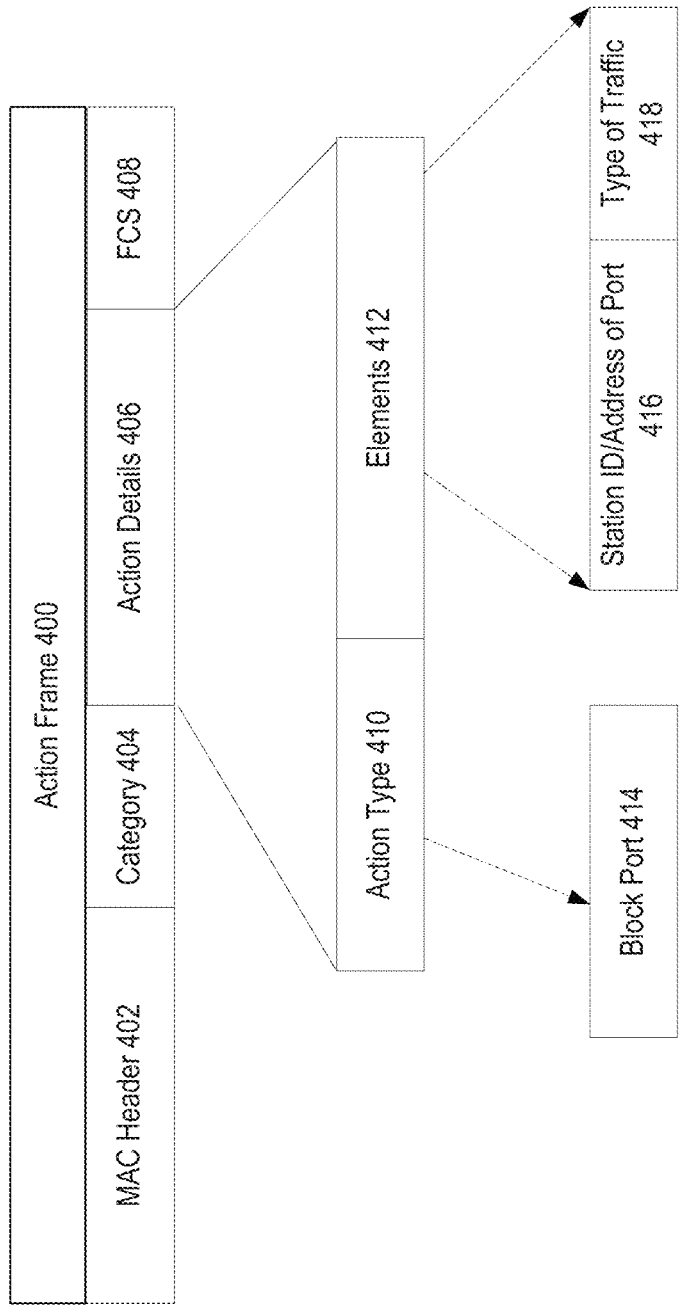
FIG. 14 illustrates a schematic block diagram of an embodiment of an action frame.

FIG. 14 illustrates a schematic block diagram of an embodiment of an action frame 400. The action frame 400 in an embodiment is an IEEE 802.11 type of management frame though other types of management or control frames may be used for the same or similar functions described herein. The MAC header 402 of action frame 400 includes, e.g. destination and source address fields, duration field, BSS ID field, a sequence control field and frame control field. The frame check sequence (FCS) field 408 is a redundancy check at the end of the action frame 400 to check its integrity. The action details field 406 includes an action type field 410 and an action elements field 412. The action type field 410 species the type of action being undertaken. The action elements field 412 includes one or more parameters for the type of action being undertaken.

In an embodiment, action frame 400 is defined for AP 120 to command a wireless station 122 to block traffic of a wireless port 124. The action type 410 specifies an action of type of block port 414. The elements field 412 specifies, e.g., a station ID or MAC address for the wireless station and/or a virtual port address 416 (such as in a point to point model when a plurality of virtual ports with unique MAC addresses may be created at a wireless station). The elements field 412 may also specify the type of traffic to block 418, such as ingress, egress or all traffic. Other action frames 400 may specify additional action types 410 and elements 412 for performing other management functions needed for STA bridge mode of operation.

Figure 15:
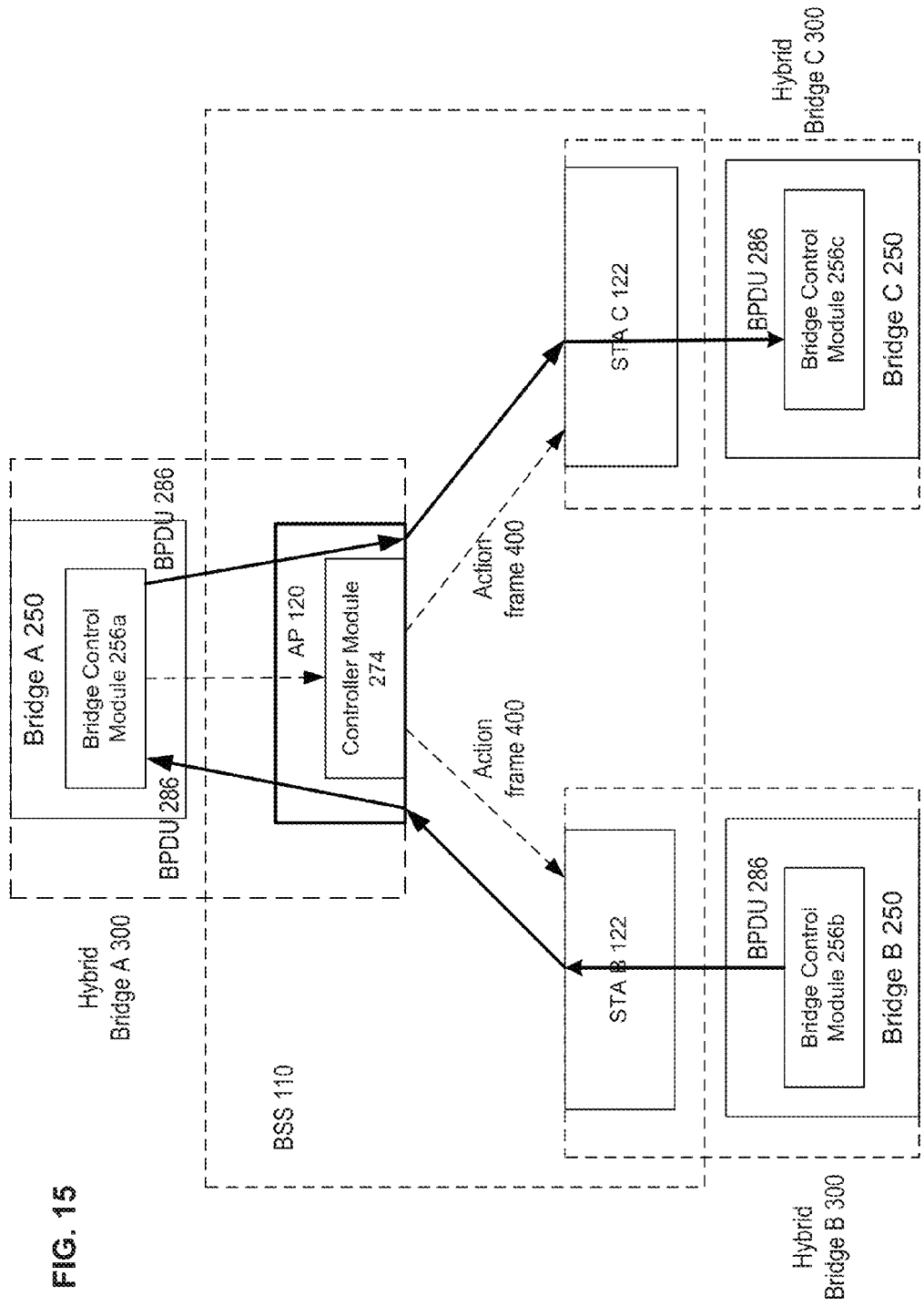
FIG. 15 illustrates a schematic block diagram of an embodiment of a method for an access point to control one or more layer 2 bridge protocols or network functions in a point to point model of STA bridging mode of operation

FIG. 15 illustrates a schematic block diagram of an embodiment of a method for an AP 120 to control one or more layer 2 bridge protocols or network functions in a point to point model of STA bridging mode of operation. BPDUs 286 are communicated between bridge control modules 256 of bridges 250 for performing layer 2 bridge protocols or network functions, such as STP, topology changes and updates, etc. However, AP 120 performs one or more control functions for the BSS 110. Control module 274 in AP 120 is operable to transmit action frames 400 (or other types of frames to implement bridge port commands 284) to the wireless stations 122 in the BSS 110. For example, as described herein, AP 120 may manage a spanning tree protocol to determine loops in the basic service set 110. AP 120 is then operable to issue action frames 400 to wireless stations 122 to "block" egress traffic from one or more virtual wireless ports 124 to prevent loops. AP 120 may also issue action frames 400 to wireless stations to reserve bandwidth or configure virtual wireless ports 124.

FIGS. 16A-D illustrate logical flow diagrams of an embodiment of methods for forwarding a frame between an IEEE 802.11 protocol compliant MAC port interface and an IEEE 802.3 protocol compliant MAC port interface in a wireless device, such as AP 120 or STA 122. An IEEE 802.11 protocol includes wireless local area network (WLAN) protocols, such as IEEE 802.11a, b, g, n protocols or other IEEE 802.11 protocol incorporated by reference herein. IEEE 802.3 protocol includes IEEE 802.3xx Standards for Ethernet based LANs, issued from the IEEE 802.3 Working Group between 1973 and 2012 or other Ethernet protocols for a wired interface. IEEE 802.1Q-2011 and IEEE 802.1Q-2012 describe forwarding process functions as illustrated in FIG. 8-10 therein between IEEE 802.3 protocol compliant ports. FIG. 16 herein illustrates various modifications to the forwarding process to enhance forwarding between an IEEE 802.11 protocol compliant MAC port interface and an IEEE 802.3 protocol compliant MAC port interface.

Figures 16A, 16B, 16C, 16D:
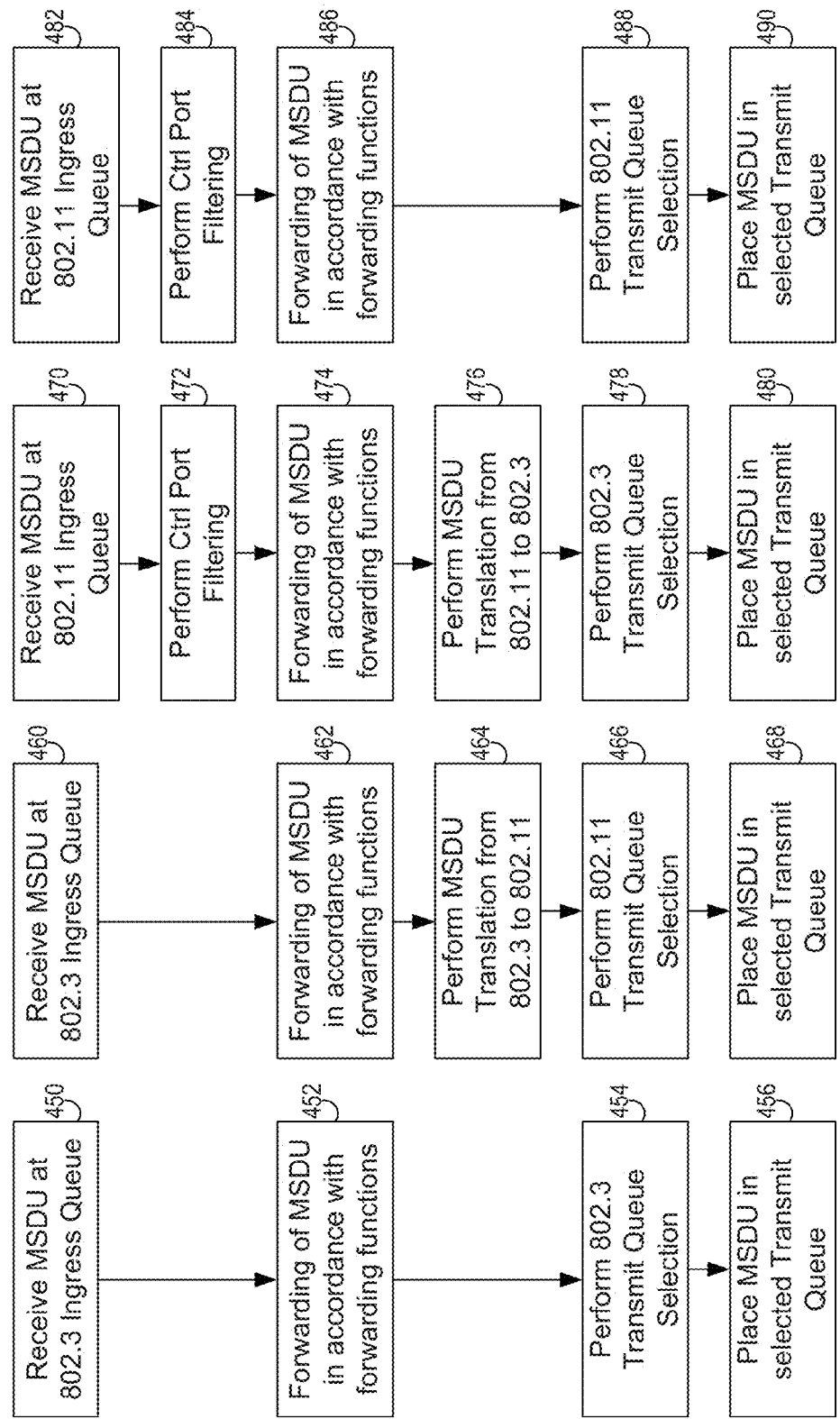
FIGS. 16A-D illustrate logical flow diagrams of an embodiment of methods for forwarding a frame between an IEEE 802.11 protocol compliant MAC port interface and an IEEE 802.3 protocol compliant MAC port interface.

FIG. 16A illustrates a logical flow diagram of an embodiment of a method for forwarding a frame between an IEEE 802.3 protocol compliant MAC port interface and another IEEE 802.3 protocol compliant MAC port interface. In step 450, an MSDU is received at an ingress queue of an IEEE 802.3 MAC port interface. The MSDU is forwarded in step 452 approximately in accordance with forwarding process functions described IEEE 802.1Q-2011 with respect to FIG. 8-10 therein. In step 454, a transmit queue is selected in accordance with IEEE 802.3 protocol queue selection processes. For example, a transmit queue is selected in response to priority levels assigned to the MSDU based on traffic types defined in IEEE 802.1Q-2012. In step 456, the MSDU is placed in the selected transmit queue for transmission.

FIG. 16B illustrates a logical flow diagram of an embodiment of a method for forwarding a frame between an IEEE 802.3 protocol compliant MAC port interface and an IEEE 802.11 protocol compliant MAC port interface. In step 460, an MSDU is received at an ingress queue of an IEEE 802.3 MAC port interface. The MSDU is forwarded in step 462 approximately in accordance with forwarding process functions described IEEE 802.1Q-2011 with respect to FIG. 8-10 therein. In step 464, the MSDU is translated from an IEEE 802.3 protocol compliant MSDU format to an IEEE 802.11 protocol compliant MSDU format. In step 466, a transmit queue is selected in accordance with IEEE 802.11 protocol queue selection processes. For example, a transmit queue is selected in response to priority levels assigned to the MSDU based on traffic types defined in IEEE 802.11 protocol. In step 468, the MSDU is placed in the selected transmit queue for transmission.

FIG. 16C illustrates a logical flow diagram of an embodiment of a method for forwarding a frame between an IEEE 802.11 protocol compliant MAC port interface and an IEEE 802.3 protocol compliant MAC port interface. In step 470, an MSDU is received at an ingress queue of an IEEE 802.11 MAC port interface. In step 474, control port filtering of the MSDU is performed. For example, multicast handling including multicast port management and multicast reflection prevention is performed. In multicast reflection, as described herein, an MSDU with an indication of a STA bridging mode of operation and with the DA is a Multicast or Broadcast Address, the receiving wireless station 122 determines whether the MSDU Sequence ID 170 matches any of the Sequence IDs of the latest MSDUs generated by the wireless station 122. In case of a match, the wireless station 122 discards the MSDU. A match indicates that the wireless station 122 transmitted the original MSDU, and so the wireless station 122 discards the MPDU to avoid loops. In addition, the wireless station 122 may also determine whether the ingress port and/or type of traffic for the MSDU has been blocked. Other types of control port filtering may also be performed. In step 474, the MSDU is forwarded approximately in accordance with forwarding process functions described IEEE 802.1Q-2011 with respect to FIG. 8-10 therein. In step 476, the MSDU is translated from an IEEE 802.11 protocol compliant MSDU format to an IEEE 802.3 protocol compliant MSDU format. In step 478, a transmit queue is selected in accordance with IEEE 802.3 queue selection processes. For example, a transmit queue is selected in response to priority levels assigned to the MSDU based on traffic types defined in IEEE 802.1Q-2012. In step 480, the MSDU is placed in the selected transmit queue for transmission.

FIG. 16D illustrates a logical flow diagram of an embodiment of a method for forwarding a frame between an IEEE 802.11 protocol compliant MAC port interface and an IEEE 802.11 protocol compliant MAC port interface. In step 482, an MSDU is received at an ingress queue of an IEEE 802.11 MAC port interface. In step 484, control port filtering of the MSDU is performed. For example, multicast handling including multicast port management and multicast reflection prevention is performed. In multicast reflection, as described herein, an MSDU with an indication of a STA bridging mode of operation and with the DA is a Multicast or Broadcast Address, the receiving wireless station 122 determines whether the MSDU Sequence ID 170 matches any of the Sequence IDs of the latest MSDUs generated by the wireless station 122. In case of a match, the wireless station 122 discards the MSDU. A match indicates that the wireless station 122 transmitted the original MSDU, and so the wireless station 122 discards the MPDU to avoid loops. In addition, the wireless station 122 may also determine whether the ingress port and/or type of traffic for the MSDU has been blocked. Other types of control port filtering may also be performed. In step 486, the MSDU is forwarded approximately in accordance with forwarding process functions described IEEE 802.1Q-2011 with respect to FIG. 8-10 therein. In step 488, a transmit queue is selected in accordance with IEEE 802.11 protocol queue selection processes. For example, a transmit queue is selected in response to priority levels assigned to the MSDU based on traffic types defined in IEEE 802.11 protocol. In step 490, the MSDU is placed in the selected transmit queue for transmission.

Figure 17:
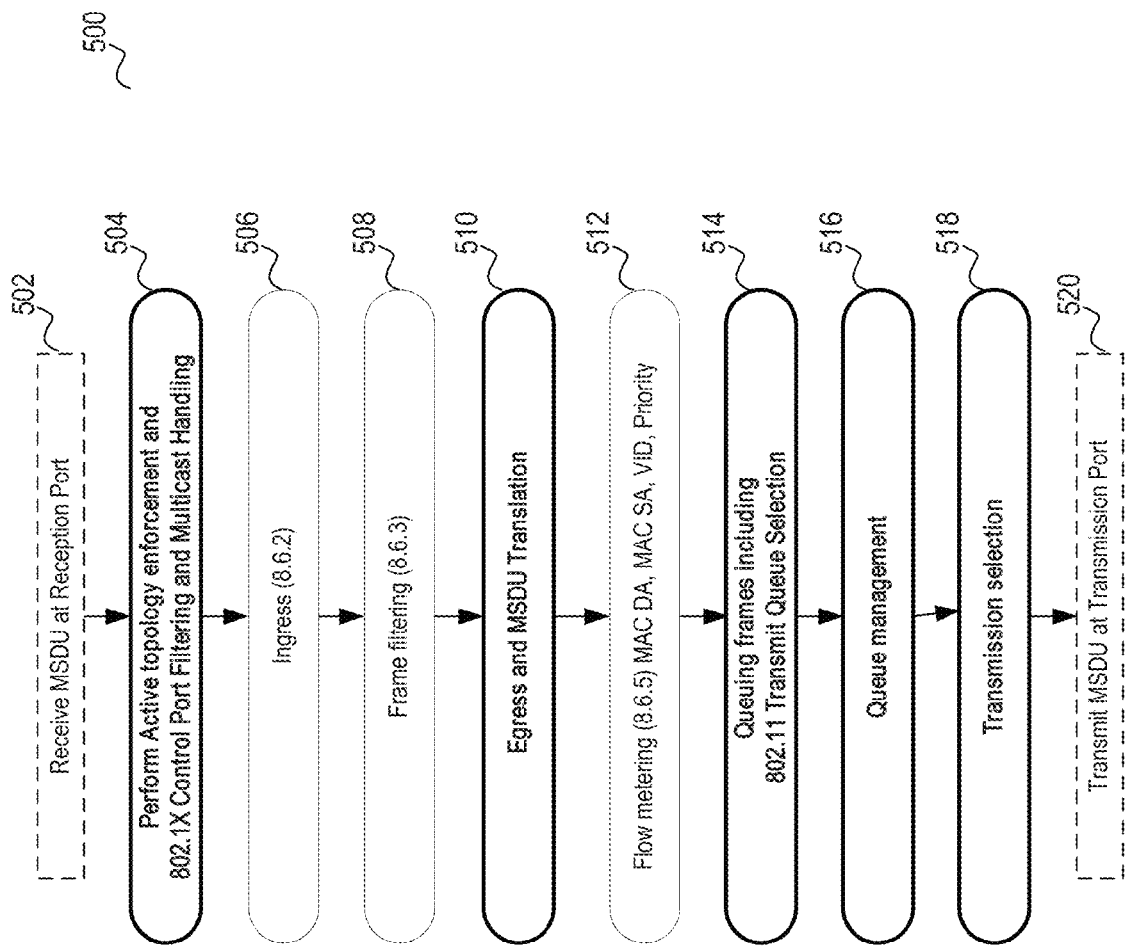
FIG. 17 illustrates a logical flow diagram of an embodiment of a method for forwarding an MSDU between MAC port interfaces.

FIG. 17 illustrates a logical flow diagram of an embodiment of a method 500 for forwarding an MSDU between MAC port interfaces, including IEEE 802.11 protocol and IEEE 802.3 protocol compliant MAC port interfaces. IEEE 802.1Q-2011 and IEEE 802.1Q-2012 describe forwarding process functions for MSDUs between IEEE 802.3 protocol compliant MAC port interfaces as illustrated in FIG. 8-10 therein. To accommodate IEEE 802.11 protocol compliant MAC port interfaces as well as IEEE 802.3 protocol compliant MAC port interfaces, the forwarding process functions for MSDUs in IEEE 802.1Q-2011 and IEEE 802.1Q-2012 need to be modified. In an embodiment, modifications are described herein to the forwarding process functions to accommodate IEEE 802.11 protocol compliant MAC port interfaces though other modifications, including deletions and additions, may also be included as well.

In step 502, an MSDU is received at an ingress queue of a MAC port interface, e.g. either an IEEE 802.11 or IEEE 802.3 protocol compliant MAC port interface or other type of MAC interface. In step 504, active topology enforcement and/or 802.1 control port filtering of the MSDU is performed. For example, control port filtering includes multicast handling, such as multicast port management and multicast reflection prevention. In multicast reflection, as described herein, an MSDU with an indication of a STA bridging mode of operation and with the DA is a Multicast or Broadcast Address, the receiving device (e.g., a wireless station 122, AP 120, Ethernet Bridge or other type of device with a MAC port interface) determines whether the MSDU Sequence ID 170 matches any of the Sequence IDs of the latest MSDUs generated by the device. In case of a match, the device discards the MSDU. A match indicates that the device transmitted the original MSDU, and so the device discards the MPDU to avoid loops. In addition, the device may also determine whether the ingress port and/or type of traffic for the MSDU has been blocked. Other types of control port filtering may also be performed. In step 506, ingress processing is performed.

Frame filtering based on a filtering database of the MSDU is performed in step 508. In step 510 egress processing is performed and if necessary, MSDU translation between an IEEE 802.11 protocol compliant MSDU format and an IEEE 802.3 protocol compliant MSDU format. In step 512, flow metering is performed. The flow metering may be performed using the MAC destination address (DA), the MAC source address (SA), VLAN identification (VID) and/or priority of the MSDU. In step 514, a transmit queue is selected. Selection of the queue considers priority levels assigned to the MSDU based on traffic types defined in IEEE 802.11 protocol and/or based on traffic types defined in IEEE 802.1Q-2012 protocol. In an embodiment, priority levels are mapped between IEEE 802.1Q defined "priority levels" and IEEE 802.11 protocol defined "access categories" for consistency. For example, IEEE 802.11 protocol, specifically IEEE 802.11aa defines an access category of AC_VO indicating voice traffic. This access category of AC_VO may be mapped to highest priority levels of 6 or 7 defined in IEEE 802.1Q-2012. Mapping of defined traffic priority or classes or categories between IEEE 802.11 protocol and IEEE 802.1Q/IEEE 802.1D protocol or other types of MAC type protocols may also be performed in step 514 for transmit queue selection.

Queue management of the transmit queues (aka egress queues) is performed in step 516. Queue management includes determining buffer quotas, overflows, contentions, etc. In addition, queue management accommodates retransmission requests and tracks acknowledgement for IEEE 802.11 protocol transmissions. In step 518, transmission selection from the transmit queues is performed based on flow control or shaping or other queue selection algorithms. Enhanced distributed channel access (EDCA) implemented in an IEEE 802.11 protocol compliant network may also be implemented as part of the queue selection. EDCA defines queues for different types of data and then defines various parameters for the queues, such as contention windows, wait times for data frames, etc. Other types of queue selection algorithms and processes may also be included. In step 520, the MSDU is transmitted from the transmission port. Other modifications to the IEEE 802.1Q defined forwarding process functions to accommodate IEEE 802.11 protocol compliant MAC port interfaces may also be included.

Figure 18:
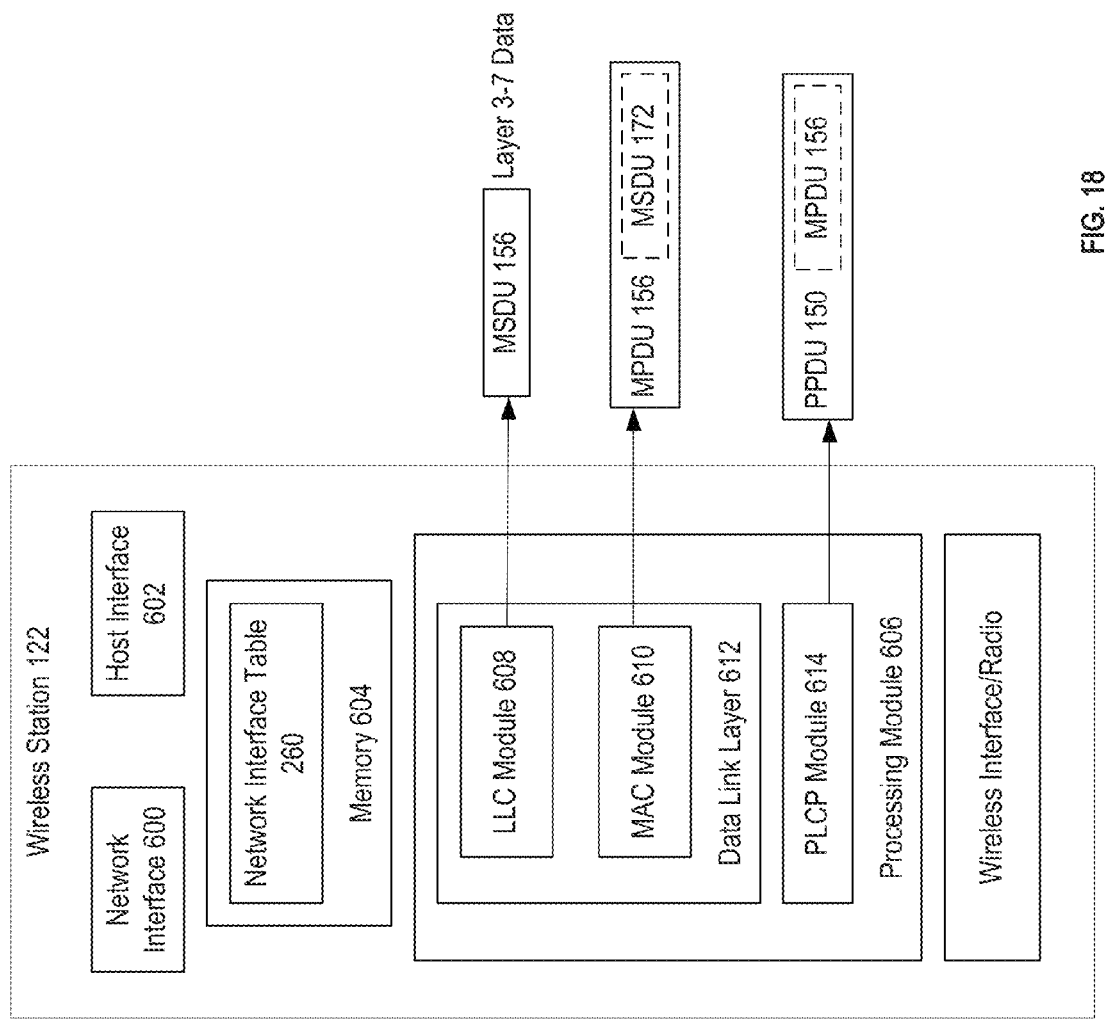
FIG. 18 illustrates a schematic block diagram of an embodiment of an architecture for a wireless device.

FIG. 18 illustrates a schematic block diagram of an embodiment of an architecture for a wireless device, such as a wireless station 122. In an embodiment, the wireless station 122 includes a network interface module 600 having at least one MAC port interface, such as an IEEE 802.1Q compliant network interface port 252, operable to connect to a node in an external network, such as a bridge 250. The host interface module 602 is operable to connect to a host device as described in more detail with respect to FIG. 20. A peripheral interface module may also be included. In another embodiment, the network interface module 600 is incorporated into the host device and the wireless station 122 is operable to connect to the node in the external network through network interface module 600 in the host device. The wireless station 122 includes one or more processing modules 606 that implement a logical link control (LLC) module 608, media access control (MAC) module 610 and a Physical Layer Convergence Procedure (PLCP) module 614. The LLC module 608 and MAC module 610 are part of a logical data link layer 612 in the wireless station 122. The processing module 606 is operable to translate layer 2 frames or layer 3 IP packets received over the network interface from the external network to frames for transmission by the wireless interface and vice versa. For example, the MAC module 610 is operable to encapsulate a MAC Service Data Unit (MSDU) 156 into a MAC Protocol Data Unit (MPDU) 156 in accordance with a WLAN protocol. The Physical Layer Convergence Procedure (PLCP) Module 614 is operable to convert the MPDU (also known as a PSDU at layer 1) into a PLCP Protocol Data Unit (PPDU) 150 in accordance with the WLAN protocol. The wireless interface/radio 60 is operable to convert the PPDU 150 into a plurality of radio frequency (RF) signals in accordance with one of a plurality of operating modes of the WLAN protocol for transmission by the wireless interface 60 as described in more detail with respect to FIG. 20. The wireless station 122 further includes a memory 604 that includes a network interface table 260. The network interface table 260 stores identification of network interface ports of the wireless station and associated addresses of the one or more external network nodes accessible by the network interface 600 and/or host interface 602.

Figure 19:
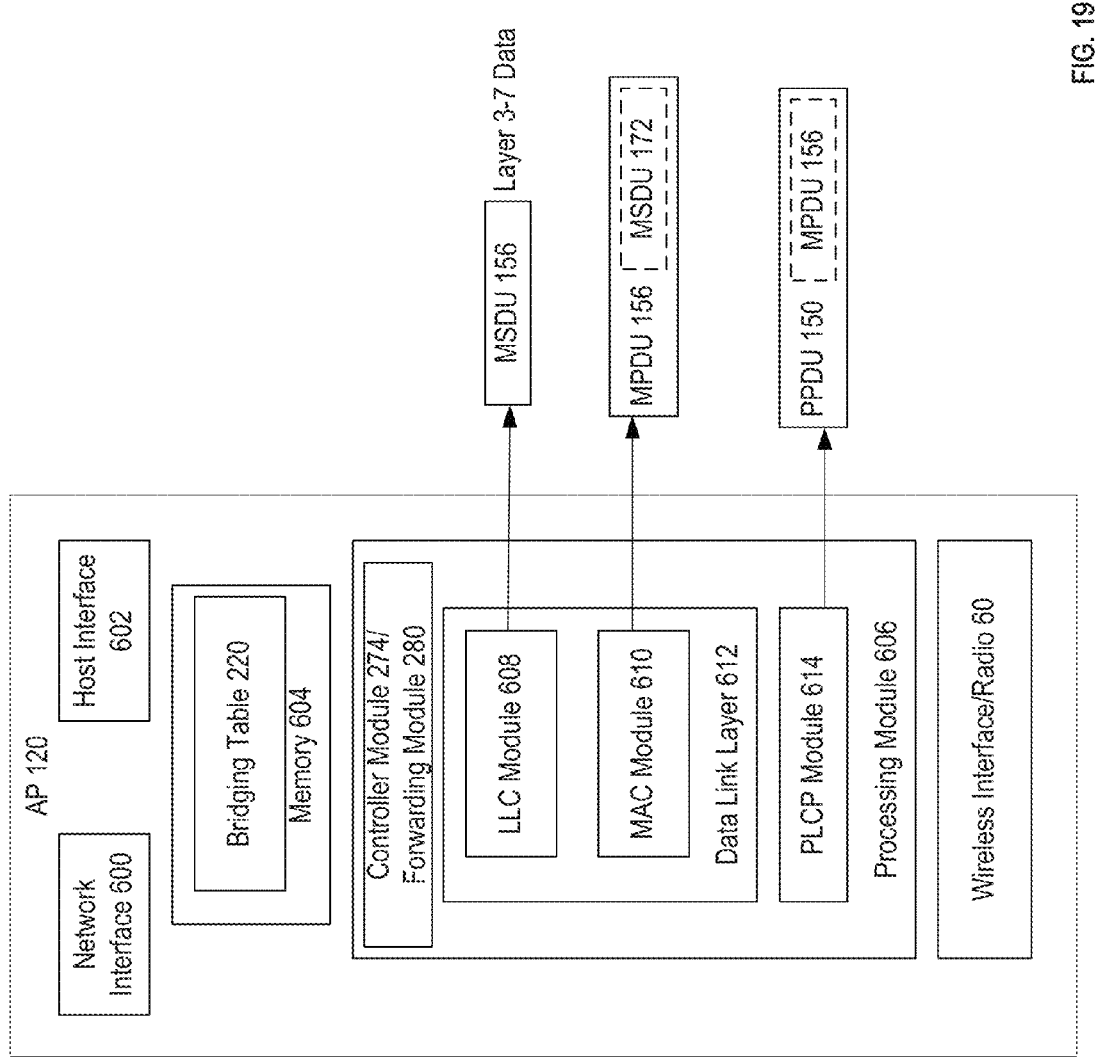
FIG. 19 illustrates a schematic block diagram of an embodiment of an architecture for an access point.

FIG. 19 illustrates a schematic block diagram of an embodiment of an architecture for an access point 120. In an embodiment, AP 120 includes a network interface module 600 having at least one MAC port interface, such as an IEEE 802.1Q compliant network interface port 252, operable to connect to a node in an external network, such as a bridge 250. The host interface module 602 is operable to connect to a host device as described in more detail with respect to FIG. 20. A peripheral interface module may also be included. In another embodiment, the network interface module 600 is incorporated into the host device and the AP 120 is operable to connect to the node in the external network through network interface module 600 in the host device. AP 120 includes one or more processing modules 606 that implement a logical link control (LLC) module 608, media access control (MAC) module 610 and a Physical Layer Convergence Procedure (PLCP) module 614. The LLC module 608 and MAC module 610 are part of a logical data link layer 612 in AP 120. The MAC module 610 is operable to encapsulate a MAC Service Data Unit (MSDU) 156 into a MAC Protocol Data Unit (MPDU) 156 in accordance with a WLAN protocol. The Physical Layer Convergence Procedure (PLCP) Module 614 is operable to convert the MPDU 156 (also known as a PSDU at layer 1) into a PLCP Protocol Data Unit (PPDU) 150 in accordance with the WLAN protocol. The wireless interface/radio 60 is operable to convert the PPDU 150 into a plurality of radio frequency (RF) signals in accordance with one of a plurality of operating modes of the WLAN protocol as explained in more detail with respect to FIG. 20. AP further includes a memory 604 with bridging table 220. AP 120 also includes a controller module 274 and forwarding module 280 as described herein. These modules may be included as part of the MAC Module 610 or as separate modules.

FIG. 20 illustrates a schematic block diagram of an embodiment of a wireless device (such as wireless station 122 and AP 120) in more detail. The wireless device includes the host device 18 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62 or from the network interface 600 or from processing module 606. The baseband processing module 64 receives the outbound data 88 and based on a mode selection signal 102, produces one or more outbound symbol streams 90. The mode selection signal 102 will indicate a particular mode for transmitting the outbound symbol streams 90. For example, the mode selection signal 102 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. A code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode. The mode select signal may further indicate a power spectral density mask value. The mode select signal may alternatively indicate rates for a particular channelization. As a further alternative, the mode select signal 102 may indicate a 2.4 GHz frequency band, 20 MHz channels and a maximum bit rate of 192 megabits-per-second. A number of antennae may be utilized to achieve the higher bit rates. In this instance, the mode select would further indicate the number of antennae to be utilized. Another mode option includes a frequency band of 2.4 GHz, the channel bandwidth is 20 MHz and the maximum bit rate is 192 megabits-per-second. Various bit rates ranging from 12 megabits-per-second to 216 megabits-per-second utilizing 2-4 antennae and a spatial time encoding rate may be indicated. The mode select signal 102 may further indicate a particular operating mode, which corresponds to a 5 GHz frequency band having 40 MHz frequency band having 40 MHz channels and a maximum bit rate of 486 megabits-per-second. The bit rate may range from 13.5 megabits-per-second to 486 megabits-per-second utilizing 1-4 antennae and a corresponding spatial time code rate. A particular modulation scheme code rate and NBPSC values may also be specified for a mode as well as a power spectral density mask. It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90 from the outbound data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80 converts the inbound RF signals 94 into a corresponding number of inbound symbol streams 96. The number of inbound symbol streams 96 will correspond to the particular mode in which the data was received. The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of in FIG. 20 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

A STA bridging mode of operation in a basic service set is described herein. In an embodiment, a station in a basic service set of a wireless network includes layer 2 bridging functionality to one or more nodes in other networks. An access point in the basic service set acts as a control plane for the bridging functionality. The access point includes bridge address learning and a bridging table to map destination addresses and associated bridging stations. The STA bridging mode provides interoperability between multi-vendors devices and extends the usage of wireless devices in home where the wired connectivity is partial. Other current alternatives are only partial solutions to overcome this lack of bridging functionality and are proprietary only. They are also limited to certain type of traffic or/and based on Layer 3 protocols (such IP Multicast to MAC Multicast translation, NAT—Network Address Translation).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, processor, hardware, and/or memory that stores operational instructions for performing one or more functions as may be described herein. Note that, if the module is implemented via hardware, the hardware may operate independently and/or in conjunction with software and/or firmware. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for a bridging mode of operation in a wireless network including a wireless station and an access point, comprising:
    receiving a frame, from a node in an external network, over a wired network interface of the wireless station, wherein the frame includes a source media access control (MAC) address and a destination MAC address; and transmitting the frame over a wireless interface of the wireless station to the access point, the wireless station and the access point associated in a basic service set (BSS), wherein the frame includes an indication of the bridging mode of operation, the source MAC address and the destination MAC address, and wherein the indication of the bridging mode of operation is included in a frame control field of a MAC protocol data unit (MPDU) wherein each of a To Distribution System (To DS) field and a From Distribution System (From DS) field is set to a logical "1", the frame enabling wireless bridging operations in the access point.

2. The method of claim 1, further including:
    translating the frame from a first protocol to a second protocol and including in the translated frame at least one of: a transmit address corresponding to a MAC address of the wireless station and a receive address corresponding to a MAC address of the access point.

3. The method of claim 1, comprising:
receiving a second frame, by the wireless station over the wireless interface, from the access point, wherein the second frame includes the indication of a bridging mode of operation and includes a second source MAC address and a second destination MAC address;
accessing a network interface table including a set of destination MAC addresses and associated network interface ports;
determining from the network interface table an associated network interface port associated with the second destination MAC address; and
transmitting the second frame over the associated network interface port.

4. The method of claim 3, further comprising:
translating the second frame from a first protocol to a second protocol and including in the translated second frame the second source MAC address and the second destination MAC address.

5. The method of claim 3, further comprising:
assigning a unique address in the BSS to a wireless link between the wireless station and the access point to establish a first virtual wireless port;
receiving the second frame over the first virtual wireless port of the wireless interface;
determining the second source MAC address of the second frame; and
storing the second source MAC address as a destination MAC address associated with an identification of the first virtual wireless port in a forwarding table.

6. The method of claim 5, wherein the forwarding table includes a plurality of destination MAC addresses and associated addresses of virtual wireless ports of the wireless station.

7. The method of claim 6, further comprising:
receiving a third frame from the node in the external network, wherein the third frame includes a third source MAC address and a third destination MAC address;
accessing the forwarding table to determine a virtual wireless port associated with the third destination MAC address; and
transmitting the third frame over the virtual wireless port associated with the third destination MAC address, wherein the third frame includes the indication of a bridging mode of operation and includes the third source MAC address and the third destination MAC address.

8. The method of claim 7, wherein the virtual wireless port associated with the third destination MAC address is operably coupled via a direct wireless link to another wireless station.

9. A wireless station operable for a bridging mode of operation in a wireless local area network (WLAN) including an access point, the wireless station and the access point associated in a basic service set (BSS), comprising:
at least one processing module configured to:
receive a first frame from a node in an external network, wherein the first frame includes a source media access control (MAC) address and a destination MAC address; and
generate a second frame for transmission over the WLAN to the access point, wherein the second frame includes an indication of the bridging mode of operation, the source MAC address and the destination MAC address, and wherein the indication of the bridging mode of operation is included in a frame control field of a MAC protocol data unit (MPDU) within which each of a To Distribution System (To DS) field and a From Distribution System (From DS) field is set to a logical "1", wherein the indication of the bridging mode of operation functions to enable wireless bridging operations in the access point.

10. The wireless station of claim 9, wherein the processing module is further configured to generate the second frame by:
translating the frame from a first protocol to a second protocol and including in the translated frame at least one of: a transmit address corresponding to a MAC address of the wireless station and a receive address corresponding to a MAC address of the access point.

11. The wireless station of claim 9, wherein the at least one processing module is further configured to:
receive a third frame over the WLAN from the access point, wherein the third frame includes the indication of a bridging mode of operation and includes a second source MAC address and a second destination MAC address;
access a network interface table including a set of destination MAC addresses and associated network interface ports;
determine from the network interface table an associated network interface port associated with the second destination MAC address; and
forward the third frame over the associated network interface port.

12. The wireless station of claim 11, wherein the at least one processing module is further configured to:
translate the third frame from a first protocol to a second protocol and including in the third frame the second source MAC address and the second destination MAC address.

13. The wireless station of claim 11, wherein the at least one processing module is further configured to:
receive the third frame over a first virtual wireless port of the wireless station;
determine the second source MAC address of the third frame; and
store the second source MAC address as a destination MAC address associated with an identification of the first virtual wireless port in a forwarding table.

14. The wireless station of claim 13, wherein the forwarding table includes a plurality of destination MAC addresses and associated addresses of virtual wireless ports of the wireless station.

15. The wireless station of claim 14, wherein the at least one processing module is further configured to:
receive a fourth frame from the node in the external network, wherein the fourth frame includes a third source MAC address and a third destination MAC address;
access the forwarding table to determine a virtual wireless port associated with the third destination MAC address; and
forward the fourth frame over the virtual wireless port associated with the third destination MAC address, wherein the third frame includes the indication of a bridging mode of operation and includes the third source MAC address and the third destination MAC address.

16. The wireless station of claim 15, wherein the virtual wireless port associated with the third destination MAC address is operably coupled via a direct wireless link to another wireless station in the WLAN.

17. An access point operable for a bridging mode of operation in a wireless local area network (WLAN), comprising:
a wireless interface configured to receive a first frame from a wireless station in the WLAN, the wireless station associated with the access point in a basic service set (BSS), wherein the first frame includes an indication of the bridging mode of operation, a source media access control (MAC) address and a destination MAC address, the indication of the bridging mode of operation included in a frame control field of a MAC protocol data unit (MPDU) of the first frame in which each of a To Distribution System (To DS) field and a From Distribution System (From DS) field is set to a logical "1";
a memory configured to store a bridging table, wherein the bridging table includes a set of MAC addresses associated with wireless stations in the BSS; and at least one processing module configured to: access the bridging table; determine the wireless station associated with the destination MAC address in the first frame; and generate a second frame for transmission over the wireless interface to the wireless station, wherein the second frame includes the indication of the bridging mode of operation, the source MAC address, the destination MAC address, a transmit address of the access point, and a receive address of the wireless station.

18. The access point of claim 17, wherein the at least one processing module is configured to:
process a spanning tree protocol for the BSS;
determine a loop in frame forwarding between wireless stations and the access point in the BSS; and
transmit a command to at least one of the wireless stations requesting to block transmissions from the wireless station.

19. The access point of claim 18, wherein the command is included in an action frame.

20. The access point of claim 19, wherein the action frame has an action type of block port and one or more fields identifying a port of the at least one of the wireless station for blocking.

* * * * *